(12) United States Patent
Tsutsui et al.

(10) Patent No.: US 6,552,967 B1
(45) Date of Patent: Apr. 22, 2003

(54) OPTICAL OUTPUT ADJUSTING APPARATUS BASED ON SHORTEST RECORDING MARKS

(75) Inventors: Keiichi Tsutsui, Kanagawa (JP); Yasuyuki Takeshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/566,577

(22) Filed: May 8, 2000

(30) Foreign Application Priority Data

May 19, 1999 (JP) .......................................... 11-139169

(51) Int. Cl.$^7$ ............................................. G11B 11/00
(52) U.S. Cl. ................................. 369/13.27; 369/47.53
(58) Field of Search ........................... 369/13.27, 13.26, 369/116, 59.21, 59.2, 47.27, 47.28, 47.35, 47.53, 53.27, 53.31, 59.17, 47.5

(56) References Cited

U.S. PATENT DOCUMENTS

| | | | |
|---|---|---|---|
| 5,367,509 A | | 11/1994 | Fukumoto et al. |
| 5,537,381 A | * | 7/1996 | Fuji ........................... 369/116 |
| 5,539,720 A | | 7/1996 | Aol |
| 5,617,400 A | * | 4/1997 | Fuji ........................... 369/116 |
| 5,703,841 A | | 12/1997 | Hiroki |
| 5,808,972 A | * | 9/1998 | Matsumoto et al. .......... 369/13 |
| 5,862,103 A | * | 1/1999 | Matsumoto et al. .......... 369/13 |
| 6,125,085 A | * | 9/2000 | Fuji et al. ...................... 369/13 |
| 6,288,992 B1 | * | 9/2001 | Okumura et al. .......... 369/47.5 |
| 6,310,846 B1 | * | 10/2001 | Fuji ........................ 369/53.31 |
| 6,385,141 B1 | * | 5/2002 | Tani et al. ................ 369/13.54 |
| 6,392,970 B1 | * | 5/2002 | Fuji et al. .................. 369/47.5 |
| 6,404,717 B1 | * | 6/2002 | Okumura et al. ........ 369/59.21 |

FOREIGN PATENT DOCUMENTS

| | | |
|---|---|---|
| DE | 195 06 374 | 9/1995 |
| EP | 0 549 138 | 6/1993 |
| EP | 0 887 790 | 12/1998 |
| EP | 0 896 326 | 2/1999 |
| EP | 0 907 167 | 4/1999 |
| JP | 6-290496 | 10/1994 |
| JP | 10-92037 | 4/1998 |

OTHER PUBLICATIONS

Patent Abstracts of Japan, JP 09–161301, Jun. 20, 1997.
Patents Abstracts of Japan, JP 05–166188, Jul. 2, 1993.
Patent Abstracts of Japan, JP 09–102147, Apr. 15, 1997.
Patent Abstracts of Japan, JP 08–335323, Dec. 17, 1996.

* cited by examiner

Primary Examiner—Tan Dinh
(74) Attorney, Agent, or Firm—Oblon, Spivak, McClelland, Maier & Neustadt, P.C.

(57) ABSTRACT

A reproducing laser output can be adjusted to an optimal level. To this end, a magneto-optical disk device includes a differential amplifier and a shortest recording mark identifier that detects a shortest recording mark reproducing signal corresponding to a component of a shortest recording mark in a reproducing signal obtained by reproducing a magneto-optical disk. In addition, an envelope detector detects an amplitude level of the shortest recording mark reproducing signal, a comparator compares the amplitude level with a reference voltage outputted from the reference voltage source, and a drive control section adjusts the reproducing laser beam to an output level at which the amplitude level is equal to or higher than the reference voltage, based on a comparison result from the comparator.

28 Claims, 5 Drawing Sheets

OPTICAL OUTPUT ADJUSTING APPARATUS BASED ON SHORTEST RECORDING MARKS

BACKGROUND OF THE INVENTION

1. Field of the Invention

The present invention relates to an optical output adjustment apparatus and an optical output adjustment method for adjusting an optical output level of a reproducing laser used for reproducing a record mark recorded on a magneto-optical recording medium.

2. Description of Related Art

In recent years, attention has been paid to a magneto-optical disk as a high-density recording medium which enables rewriting of information signals. For example, the Japanese Patent Application KOKAI Publication No. 6-290496 (hereinafter called a reference 1) discloses a magneto-optical reproducing method which utilizes a point that a magneto-optical disk including at least three layers of a displacement layer, a switching layer, and a memory layer as magnetic layers are used so that the size of magnetic sectors recorded on the memory layer is substantially magnified on the moving layer. For example, the magneto-optical reproducing method is a so-called DWDD (Domain Wall Displacement Detection) in which a reproducing laser beam is irradiated during reproducing such that an area in the switching layer is set to a curie temperature or more, and magnetic connection between the memory layer and the displacement layer, which corresponds to the area, is disconnected to detect a magnetic wall which moves within the area of the moving layer corresponding to an area where the magnetic connection is disconnected. In this manner, the size of the magnetic sectors recorded on the memory layer is substantially magnified on the displacement layer to enlarge the reproducing carrier signal.

In the magneto-optical reproducing method based on this DWDD, i.e., in a so-called magnetic wall displacement detection reproducing method (hereinafter called a DWDD reproducing method), it is possible to reproduce a very large information signal even from an optical limit resolution of a reproducing laser, so the recording density can be heightened without changing the wavelength of the reproducing laser beam and the numerical aperture NA of the objective leans.

Meanwhile, in the DWDD reproducing method, the output level of the reproducing laser beam must be set to a certain level which causes magnetic displacement. However, no optimal output level for the reproducing laser beam has been known. This is because the optimal output level differs depending on the conditions such as a peripheral temperature change, variants of sensitivity of between magneto-optical disks, and the like. However, if the optimal value of the output level of the reproducing laser beam cannot be grasped and the output level of the reproducing laser beam is too large, record marks recorded on adjacent recording tacks may be deteriorated.

BRIEF SUMMARY OF THE INVENTION

Hence, the present invention has been made in view of the above situation and has an object of providing an optical output adjustment apparatus and an optical output adjustment method which are capable of adjusting a reproducing the reproducing laser beam to an optimal output level.

To achieve the above object, an optical output adjustment apparatus according to the present invention is constructed as an apparatus for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data.

The optical output adjustment apparatus comprises: a light source for emitting the reproducing laser beam; reproducing signal detector means for detecting a shortest recording mark reproducing signal corresponding to a component of a shortest recording mark in a reproducing signal obtained by reproducing the magneto-optical information recording medium; signal amplitude level detector means for detecting an amplitude level of the shortest recording mark reproducing signal; comparator means for comparing the amplitude level with a predetermined threshold value; and optical output control means for adjusting the reproducing laser beam to an output level which makes the amplitude level equal to or higher than the predetermined threshold value.

In the optical output adjustment apparatus having the structure as described above, based on a comparison result between a predetermined threshold value and an amplitude level of a shortest recording mark reproducing signal corresponding to a component of a shortest recording mark in a reproducing signal obtained by reproducing the magneto-optical information recording medium, the reproducing laser beam is adjusted to an output level which makes the amplitude level equal to or higher than the predetermined threshold value.

By the reproducing laser beam whose output level is thus controlled, it is possible to obtain a reproducing signal with a lowered jitter.

Also, to achieve the above object, an optical output adjustment method according to the present invention is a method for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data, characterized in that, based on a comparison result between a predetermined threshold value and an amplitude level of a shortest recording mark reproducing signal corresponding to a component of a shortest recording mark in a reproducing signal obtained by reproducing the magneto-optical information recording medium, the reproducing laser beam is adjusted to an output level which makes the amplitude level equal to or higher than the predetermined threshold value.

By the reproducing laser beam whose output level is thus controlled, it is possible to obtain a reproducing signal with a lowered jitter.

Also, to achieve the above object, an optical output adjustment apparatus according to the present invention is constructed as an apparatus for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data.

The optical output adjustment apparatus comprises: a light source for emitting the reproducing laser beam; first reproducing signal detector means for detecting a first recording mark reproducing signal corresponding to a component of a first recording mark in a reproducing signal obtained by reproducing the magneto-optical information recording medium; second reproducing signal detector means for detecting a second recording mark reproducing signal corresponding to a component of a second recording mark in a reproducing signal obtained by reproducing the magneto-optical information recording medium; first signal amplitude level detector means for detecting a first amplitude level of the first recording mark reproducing signal; second signal amplitude level detector means for detecting a second amplitude level of the second recording mark reproducing signal; difference value calculator means for calculating a difference value between the first and second amplitude levels; comparator means for comparing the amplitude level with a predetermined threshold value; and optical output control means for adjusting the reproducing laser beam to an output level which makes the amplitude level equal to or lower than the predetermined threshold value.

In the optical output adjustment apparatus having the structure as described above, based on a comparison result between a threshold value and a difference value between first and second amplitude levels of first and second recording mark reproducing signals corresponding to components of first and second recording marks having lengths different from each other in a reproducing signal obtained by reproducing the magneto-optical information recording medium, the reproducing laser beam is adjusted to an output level which makes the amplitude level equal to or lower than the predetermined threshold value.

By the reproducing laser beam whose output level is thus controlled, it is possible to obtain a reproducing signal with a lowered jitter.

Also, to achieve the above object, an optical output adjustment method according to the present invention is a method for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data, characterized in that, based on a comparison result between a threshold value and a difference value between first and second amplitude levels of first and second recording mark reproducing signals corresponding to components of first and second recording marks having lengths different from each other in a reproducing signal obtained by reproducing the magneto-optical information recording medium, the reproducing laser beam is adjusted to an output level which makes the amplitude level equal to or lower than the predetermined threshold value.

By the reproducing laser beam whose output level is thus controlled, it is possible to obtain a reproducing signal with a lowered jitter.

Also, to achieve the above object, an optical output adjustment apparatus according to the present invention is constructed as an apparatus for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data.

The optical output adjustment apparatus comprises: a light source for emitting the reproducing laser beam; reproducing signal detector means for detecting a high-frequency reproducing signal consisting of a high-frequency component in a reproducing signal obtained by reproducing the magneto-optical information recording medium; signal amplitude level detector means for detecting an amplitude level of the high-frequency reproducing signal; comparator means for comparing the amplitude level with a predetermined threshold value; and optical output control means for adjusting the reproducing laser beam to an output level which makes the amplitude level equal to or higher than the predetermined threshold value.

In the optical output adjustment apparatus having the structure as described above, based on a comparison result between a predetermined threshold value and an amplitude level of a high-frequency reproducing signal of a high-frequency component in a reproducing signal obtained by reproducing the magneto-optical information recording medium, the reproducing laser beam is adjusted to an output level which makes the amplitude level equal to or higher than the predetermined threshold value.

By the reproducing laser beam whose output level is thus controlled, it is possible to obtain a reproducing signal with a lowered jitter.

Also, an optical output adjustment method according to the present invention is a method for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data, characterized in that, based on a comparison result between a predetermined threshold value and an amplitude level of a high-frequency reproducing signal of a high-frequency component in a reproducing signal obtained by reproducing the magneto-optical information recording medium, the reproducing laser beam is adjusted to an output level which makes the amplitude level equal to or higher than the predetermined threshold value.

By the reproducing laser beam whose output level is thus controlled, it is possible to obtain a reproducing signal with a lowered jitter.

Also, to achieve the above object, an optical output adjustment apparatus according to the present invention is constructed as an apparatus for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data.

The optical output adjustment apparatus comprises: a light source for emitting the reproducing laser beam; differentiator means for differentiating a reproducing signal obtained by reproducing the magneto-optical information recording medium, thereby to output a differential signal; signal amplitude level detector means for detecting an amplitude level of the differential signal; comparator means for comparing the amplitude level with a predetermined threshold value; and optical output control means for adjusting the reproducing laser beam to an output level which makes the amplitude level equal to or higher than the predetermined threshold value.

In the optical output adjustment apparatus having the structure as described above, based on a comparison result between a predetermined threshold value and an amplitude level of a differential signal obtained by differentiating a reproducing signal obtained by reproducing the magneto-optical information recording medium, the reproducing laser beam is adjusted to an output level which makes the amplitude level equal to or higher than the predetermined threshold value.

By the reproducing laser beam whose output level is thus controlled, it is possible to obtain a reproducing signal with a lowered jitter.

Also, an optical output adjustment method according to the present invention is a method for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data, characterized in that, based on a comparison result between a predetermined threshold value and an amplitude level of a differential signal obtained by differentiating a reproducing signal obtained by reproducing the magneto-optical information recording medium, the reproducing laser beam is adjusted to an output level which makes the amplitude level equal to or higher than the predetermined threshold value.

By the reproducing laser beam whose output level is thus controlled, it is possible to obtain a reproducing signal with a lowered jitter.

Also, to achieve the above object, an optical output adjustment apparatus according to the present invention is constructed as a method for adjusting an output level of a reproducing laser beam, in a signal reproducing device which adopts a magnetic wall movement detection reproducing method, irradiates the reproducing laser beam onto a magneto-optical information recording medium on which data is recorded on a data area by recording marks having different recording lengths according to a predetermined modulation method and a reproducing power adjustment repetitive pattern constructed only by shortest marks is written in a reference area, and magnifies a magnetic sector by magnetic wall movement, thereby to perform reproducing of the data.

The optical output adjustment apparatus comprises: a light source for emitting the reproducing laser beam; reproducing signal detector means for detecting a power adjustment reproducing signal obtained by reproducing the reproducing power adjustment repetitive pattern; signal amplitude level detector means for detecting an amplitude level of the power adjustment reproducing signal; comparator means for comparing the amplitude level with a predetermined threshold value; and optical output control means for adjusting the reproducing laser beam to an output level which makes the amplitude level equal to or higher than the predetermined threshold value.

In the optical output adjustment apparatus having the structure as described above, based on a comparison result between a predetermined threshold value and an amplitude level of a power adjustment reproducing signal obtained by reproducing the reproducing power adjustment repetitive pattern, the reproducing laser beam is adjusted to an output level which makes the amplitude level equal to or higher than the predetermined threshold value.

By the reproducing laser beam whose output level is thus controlled, it is possible to obtain a reproducing signal with a lowered jitter.

Also, to achieve the above object, an optical output adjustment method according to the present invention is a method for adjusting an output level of a reproducing laser beam, in a signal reproducing device which adopts a magnetic wall movement detection reproducing method, irradiates the reproducing laser beam onto a magneto-optical information recording medium on which data is recorded on a data area by recording marks having different recording lengths according to a predetermined modulation method and a reproducing power adjustment repetitive pattern constructed only by shortest marks is written in a reference area, and magnifies a magnetic sector by magnetic wall movement, thereby to perform reproducing of the data, characterized in that, based on a comparison result between a predetermined threshold value and an amplitude level of a power adjustment reproducing signal obtained by reproducing the reproducing power adjustment repetitive pattern, the reproducing laser beam is adjusted to an output level which makes the amplitude level equal to or higher than the predetermined threshold value.

By the reproducing laser beam whose output level is thus controlled, it is possible to obtain a reproducing signal with a lowered jitter.

Also, to achieve the above object, an optical output adjustment apparatus according to the present invention is constructed as an apparatus for adjusting an output level of a reproducing laser beam, in a signal reproducing device which adopts a magnetic wall movement detection reproducing method, irradiates the reproducing laser beam onto a magneto-optical information recording medium on which data is recorded in a data area by recording marks having different recording lengths according to a predetermined modulation method and a reproducing power adjustment pattern constructed only by first and second marks having different lengths is written in a reference area, and magnifies a magnetic sector by magnetic wall movement, thereby to perform reproducing of the data.

The optical output adjustment apparatus comprises: a light source for emitting the reproducing laser beam; first reproducing signal detector means for detecting a first mark reproducing signal corresponding to a component of the first mark in a power adjustment reproducing signal obtained by reproducing the reproducing power adjustment pattern; second reproducing signal detector means for detecting a second mark reproducing signal corresponding to a component of the second mark in a power adjustment reproducing signal obtained by reproducing the reproducing power adjustment pattern; first signal amplitude level detector means for detecting an amplitude level of the first mark reproducing signal; second signal amplitude level detector means for detecting an amplitude level of the second mark reproducing signal; difference value calculator means for calculating a difference value between the first and second amplitude levels; comparator means for comparing the difference value with a predetermined threshold value; and optical output control means for adjusting the reproducing laser beam to an output level which makes the amplitude level equal to or lower than the predetermined threshold value.

In the optical output adjustment apparatus having the structure as described above, based on a comparison result between a predetermined threshold value and a difference value between first and second amplitude levels of first and second mark reproducing signals corresponding to components of the first and second marks obtained by reproducing the reproducing power adjustment pattern.

By the reproducing laser beam whose output level is thus controlled, it is possible to obtain a reproducing signal with a lowered jitter.

Also, to achieve the above object, an optical output adjustment method according to the present invention is a method for adjusting an output level of a reproducing laser beam, in a signal reproducing device which adopts a magnetic wall movement detection reproducing method, irradiates the reproducing laser beam onto a magneto-optical information recording medium on which data is recorded in a data area by recording marks having different recording lengths according to a predetermined modulation method and a reproducing power adjustment pattern constructed only by first and second marks having different lengths is written in a reference area, and magnifies a magnetic sector by magnetic wall movement, thereby to perform reproducing of the data, characterized in that, based on a comparison result between a predetermined threshold value and a difference value between first and second amplitude levels of first and second mark reproducing signals corresponding to components of the first and second marks obtained by reproducing the reproducing power adjustment pattern.

By the reproducing laser beam whose output level is thus controlled, it is possible to obtain a reproducing signal with a lowered jitter.

Also, to achieve the above object, an optical output adjustment apparatus according to the present invention is constructed as an apparatus for adjusting an output level of a reproducing laser beam, in a signal reproducing device which adopts a magnetic wall movement detection reproducing method, irradiates the reproducing laser beam onto a magneto-optical information recording medium on which data is recorded on a data area by recording marks having different recording lengths according to a predetermined modulation method and a reproducing power adjustment repetitive pattern is written in a reference area, and magnifies a magnetic sector by magnetic wall movement, thereby to perform reproducing of the data.

The optical output adjustment apparatus comprises: a light source for emitting the reproducing laser beam; reproducing signal detector means for detecting a high-frequency component in a power adjustment reproducing signal obtained by reproducing the reproducing power adjustment repetitive pattern; signal amplitude level detector means for detecting an amplitude level of the high-frequency reproducing signal; comparator means for comparing the amplitude level with a predetermined threshold value; and optical output control means for adjusting the reproducing laser beam to an output level which makes the amplitude level equal to or higher than the predetermined threshold value.

In the optical output adjustment apparatus having the structure as described above, based on a comparison result between a predetermined threshold value and an amplitude level of a high-frequency reproducing signal consisting of a high-frequency component in a power adjustment reproducing signal obtained by reproducing the reproducing power adjustment repetitive pattern, the reproducing laser beam is adjusted to an output level which makes the amplitude level equal to or higher than the predetermined threshold value.

By the reproducing laser beam whose output level is thus controlled, it is possible to obtain a reproducing signal with a lowered jitter.

Also, to achieve the above object, an optical output adjustment method according to the present invention is a method for adjusting an output level of a reproducing laser beam, in a signal reproducing device which adopts a magnetic wall movement detection reproducing method, irradiates the reproducing laser beam onto a magneto-optical information recording medium on which data is recorded on a data area by recording marks having different recording lengths according to a predetermined modulation method and a reproducing power adjustment repetitive pattern is written in a reference area, and magnifies a magnetic sector by magnetic wall movement, thereby to perform reproducing of the data, characterized in that, based on a comparison result between a predetermined threshold value and an amplitude level of a high-frequency reproducing signal consisting of a high-frequency component in a power adjustment reproducing signal obtained by reproducing the reproducing power adjustment repetitive pattern, the reproducing laser beam is adjusted to an output level which makes the amplitude level equal to or higher than the predetermined threshold value.

By the reproducing laser beam whose output level is thus controlled, it is possible to obtain a reproducing signal with a lowered jitter.

Also, to achieve the above object, an optical output adjustment apparatus according to the present invention is constructed as an apparatus for adjusting an output level of a reproducing laser beam, in a signal reproducing device which adopts a magnetic wall movement detection reproducing method, irradiates the reproducing laser beam onto a magneto-optical information recording medium on which data is recorded on a data area by recording marks having different recording lengths according to a predetermined modulation method and a reproducing power adjustment pattern is written in a reference area, and magnifies a magnetic sector by magnetic wall movement, thereby to perform reproducing of the data.

The optical output adjustment apparatus comprises: a light source for emitting the reproducing laser beam; differentiator means for differentiating a power adjustment reproducing signal obtained by reproducing the reproducing power adjustment pattern, thereby to output a differential signal; signal amplitude level detector means for detecting an amplitude level of the differential signal; comparator means for comparing the amplitude level with a predetermined threshold value; and optical output control means for adjusting the reproducing laser beam to an output level which makes the amplitude level equal to or higher than the predetermined threshold value.

In the optical output adjustment apparatus having the structure as described above, based on a comparison result between a predetermined threshold value and an amplitude level of a differential signal obtained by differentiating a power adjustment reproducing signal obtained by reproducing the reproducing power adjustment pattern, the reproducing laser beam is adjusted to an output level which makes the amplitude level equal to or higher than the predetermined threshold value.

By the reproducing laser beam whose output level is thus controlled, it is possible to obtain a reproducing signal with a lowered jitter.

Also, to achieve the above object, an optical output adjustment method according to the present invention is a method for adjusting an output level of a reproducing laser beam, in a signal reproducing device which adopts a magnetic wall movement detection reproducing method, irradiates the reproducing laser beam onto a magneto-optical information recording medium on which data is recorded on a data area by recording marks having different recording lengths according to a predetermined modulation method and a reproducing power adjustment pattern is written in a reference area, and magnifies a magnetic sector by magnetic wall movement, thereby to perform reproducing of the data, characterized in that, based on a comparison result between a predetermined threshold value and an amplitude level of a differential signal obtained by differentiating a power adjustment reproducing signal obtained by reproducing the reproducing power adjustment pattern, the reproducing laser beam is adjusted to an output level which makes the amplitude level equal to or higher than the predetermined threshold value.

By the reproducing laser beam whose output level is thus controlled, it is possible to obtain a reproducing signal with a lowered jitter.

DETAILED DESCRIPTION OF THE INVENTION

In the following, embodiments of the present invention will be explained more specifically with reference to the drawings. In the embodiments, the present invention is applied to an optical output adjustment method adjusts the output level (hereinafter called a reproducing power ) of a reproducing laser beam in a magneto-optical disk device in which the DWDD (Domain Wall Displacement Detection) reproducing method is adopted and data is recorded by record marks having different recording lengths according to a predetermined modulation method.

The optical output adjustment method controls the reproducing power, based on the amplitude level of a signal extracted by various processing with respect to a reproducing signal of recording marks recorded on a magneto-optical disk. For example, there are various recording methods for magneto-optical disks. However, in the present embodiment, explanation will be made of an optical output adjustment method based on the 1–7 modulation method.

According to a recording method based on the 1–7 modulation method, where a window width corresponding to a channel clock is T, recording marks of 2T to 8T exist as recording marks having different recording lengths. Therefore, in case of the 1–7 modulation method, the recording mark of 2T is the shortest recording mark which has the shortest recording length, and the recording mark of 8T is the longest recording mark which has the longest recording length. If this 1–7 modulation method is adopted, data recorded on a magneto-optical disk is expressed by the recording marks of 2T to 8T.

Figure 1A:
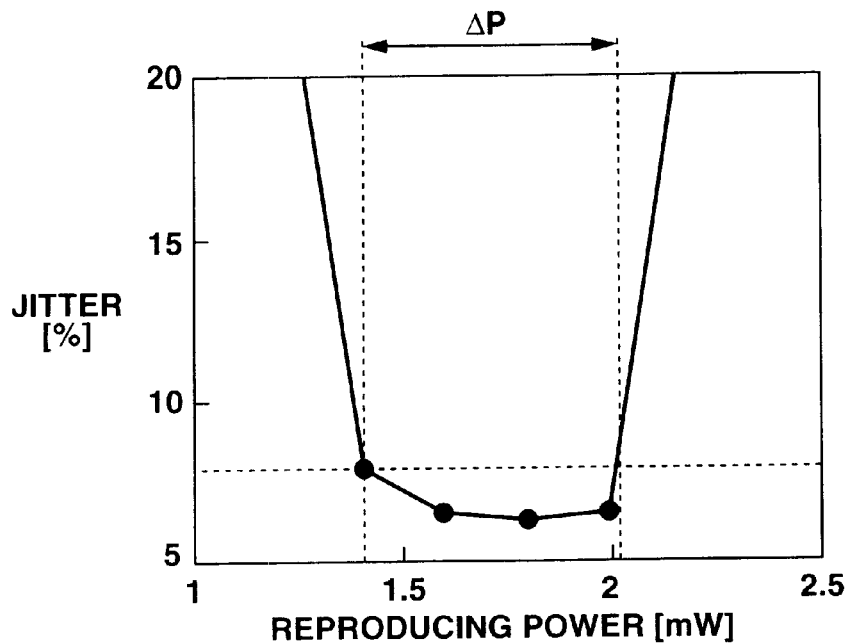
FIG. 1(A) and FIG. 1(B) are characteristic graphs used for explaining principles of an optical output adjustment method as an embodiment of the present invention and show relationships between the reproducing power, shortest recording mark amplitude level, longest recording mark amplitude level, high-frequency amplitude level, and jitter.
Figure 1B:
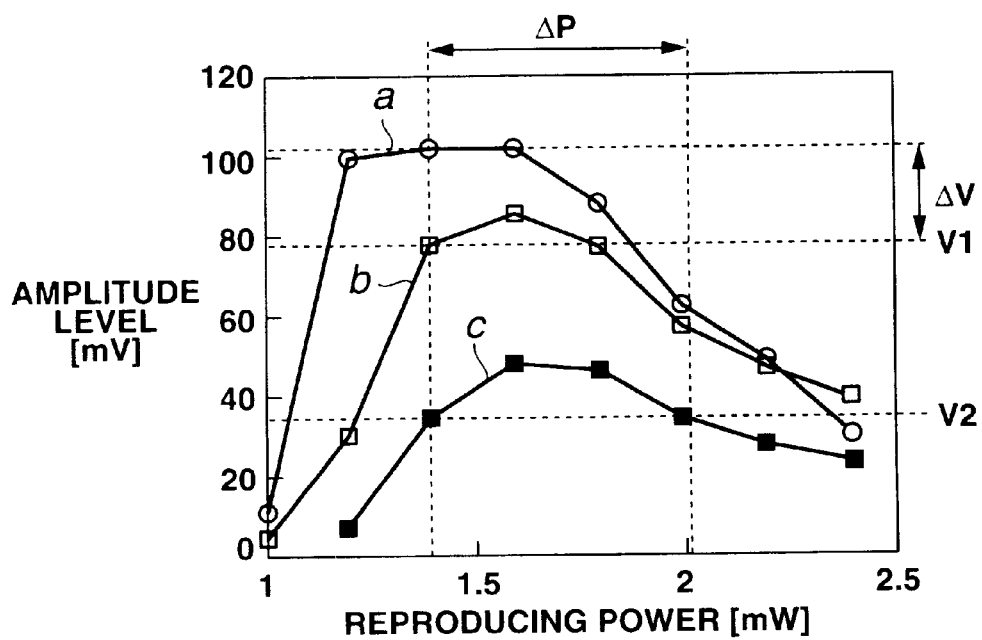

FIG. 1(A) shows a relationship between the reproducing power of a light source and the jitter of a reproducing signal. FIG. 1(B) shows amplitude levels of the shortest recording marks of 2T and 8T in a reproducing signal obtained by reproducing a magneto-optical disk, and an amplitude level of a high-frequency component of the recording mark of 2T, in case where the reproducing power is desired to increase like FIG. 1(A). In the following, the recording mark of 2T is called a shortest recording mark, a reproducing signal corresponding to the component of the shortest recording mark is called a shortest recording mark reproducing signal, the amplitude level of the shortest recording mark reproducing signal is called a shortest recording mark amplitude level, the recording mark of 8T is called a longest recording mark, a reproducing signal corresponding to the component of the longest recording mark is called a longest recording mark reproducing signal, the amplitude level of the longest recording mark reproducing signal is called a longest recording mark amplitude level, and the amplitude level of the high-frequency component is called a high-frequency amplitude level.

As shown in FIG. 1(A), in the reproducing power, there is an area ΔP (hereinafter called a low jitter reproducing power) where excellent reproducing is enabled and the jitter is low. For example, in the present embodiment, the lower jitter reproducing power ΔP (e.g., the range of reproducing power indicated by a broken line in FIG. 1(A)) is set to about 1.4 to 2.0 mW.

Meanwhile, as shown in FIG. 1(B), if the reproducing power is increased within a range like in FIG. 1(A), the longest recording mark amplitude level a increases at first, and subsequently, the shortest recording mark amplitude level b in creases. If the reproducing power is further increased, the high-frequency amplitude level c of the shortest recording mark increases. Further, the shortest recording mark amplitude level a, the longest recording mark amplitude level b, and the high-frequency amplitude level c of the shortest mark have maximum values at a reproducing power, and thereafter decrease as the reproducing power increases.

Figure 2:
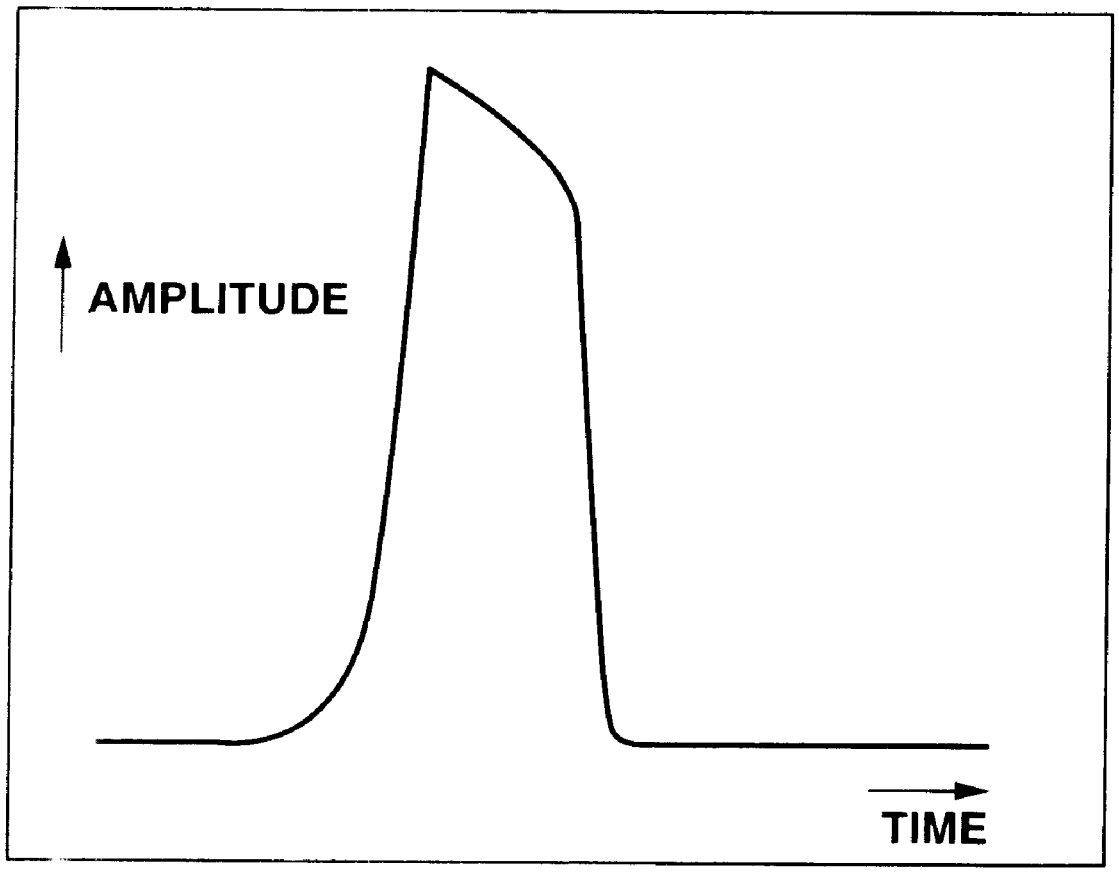
FIG. 2 is a characteristic graph showing an example of a reproducing signal obtained by a shortest mark.

Also, FIG. 2 shows an isolated pattern of the shortest recording mark reproduced by the DWDD method. As shown in this FIG. 2, in the DWDD reproducing method, a reproducing signal of the shortest recording mark has a shape which is rather similar to a sine wave than a rectangular wave. For example, this is the same as the reproducing signal waveform disclosed in the Japanese Patent Application KOKAI Publication No. 10-92037 which shows the DWDD reproducing method. The high-frequency component of the reproducing signal of the shortest recording mark described above is obtained as a result of detecting an edge component of this kind.

Thus, the shortest recording mark amplitude level a, the longest recording mark amplitude level b, and the high-frequency amplitude level b of the shortest recording mark reach a certain level or higher at the lower-jitter reproducing power ΔP. That is, changes of the shortest recording mark amplitude level a, the longest recording mark amplitude level b, and the high-frequency amplitude level b of the shortest recording mark substantially are arranged to have quantitatively equal tendencies of increase at the lower jitter reproducing power ΔP and are at a certain level or higher at the low-jitter reproducing power ΔP.

From the above, it is found that there is a certain relationship between changes of the amplitude level of a reproducing signal of the recording mark and the jitter.

Also, if the relationship between the changes of the jitter and the amplitude level of the recording signal of the recording mark is considered in view of the recording length of the recording mark, the shortest recording mark amplitude level b has a higher correlation than the longest recording mark amplitude level a. That is, the change of the shortest recording mark amplitude level b substantially corresponds qualitatively to the change of the jitter, at the low-jitter reproducing power ΔP.

In the optical output adjustment method according to the present invention, the reproducing power is thus controlled, based on the amplitude level of the reproducing signal of the recording mark having a higher correlation with the change of the jitter.

An optical output adjustment method according to the first embodiment is to control the reproducing power such that the shortest recording mark amplitude level is at a predetermined threshold value or higher, based on a result of comparison between the change of the shortest recording mark amplitude level b and the predetermined threshold value.

As described above, at the low jitter reproducing power ΔP, the shortest recording mark amplitude level is at a certain level or higher. In other words, at the reproducing power with which the amplitude level is at such a level or higher, the jitter is low.

Hence, in the optical output adjustment method according to the first embodiment, the shortest recording mark amplitude level is monitored and is compared with a predetermined threshold value, thereby to control the reproducing power such that the shortest recording mark amplitude level is at the predetermined threshold value or higher. The jitter of the reproducing signal can be lowered by this kind of method. More specifically, as shown in FIG. 1(B), the shortest recording mark amplitude level b and the threshold value V1 are compared with each other, and the reproducing power is controlled such that the shortest recording mark amplitude level b is at the threshold value V1 or higher. The reproducing power is thereby adjusted to be within the low-jitter reproducing power ΔP, and thus, the jitter of the reproducing signal can be lowered.

Also, in the 1–7 modulation method, there are recording marks of 2T to 8T. However, in the optical output adjustment method according to the first embodiment, attention is paid to the shortest recording mark amplitude level b having a high correlation with the change of the jitter, so adjustment to an optimal power is realized.

Next, explanation will be made of an optical output adjustment method according to a second embodiment. In the optical output adjustment method according to this second embodiment, the reproducing power is controlled, based on a result of comparison between a predetermined threshold value and a difference value between the shortest recording mark amplitude level b and the longest recording mark amplitude level a.

As shown in FIG. 1(B), at the low-jitter reproducing power ΔP, the difference between the shortest recording mark amplitude level b and the longest recording mark amplitude level a is small. In other words, the jitter is low at a reproducing power with which the difference value between the shortest recording mark amplitude level b and the longest recording mark amplitude level a is smaller than a certain value.

Hence, in the optical output adjustment method according to the second embodiment, the shortest recording mark amplitude level b and the longest recording mark amplitude level a of recoding marks that have different recording lengths, such as the shortest recording mark and the longest recording mark, are monitored, and the reproducing power is controlled such that the difference value between the shortest recording mark amplitude level b and the longest recording mark amplitude level a is at a predetermined threshold value or lower. The jitter of the reproducing signal can be lowered by this method. Specifically, as shown in FIG. 1(B), the difference value between the shortest recording mark amplitude level b and the longest recording mark amplitude level a is compared with a threshold value ΔV, and the reproducing power is controlled such that the difference value is at the threshold value ΔV or lower. The reproducing power is thereby adjusted to be within the low-jitter reproducing power ΔP, and the jitter of the reproducing signal can thus be lowered.

Also, the optical output adjustment method according to the second embodiment differs from the optical output adjustment method according to the first embodiment in that the reproducing power is optionally controlled without depending on recording marks, and thus, the jitter can be lowered.

Thus, at the lower-jitter reproducing power ΔP, the difference almost disappears between the shortest recording mark amplitude level b and the longest recording mark amplitude level a because the result of detection of a movement phenomenon of a magnetic wall is obtained as a reproducing signal, in the DWDD reproducing method. That is, only the boundary of the recording mark is regarded as reproducing information, and the amplitude level of the reproducing signal of the recording mark does not depend on the recording length of the recording mark.

Next, explanation will be made of a third embodiment. In this third embodiment, the reproducing power is controlled such that the amplitude level is equal to or higher than a predetermined threshold value, based on the amplitude level of the high-frequency reproducing signal of the shortest recording mark and the predetermined threshold value.

As shown in FIG. 1(B), at the low-jitter reproducing power ΔP, the high-frequency amplitude level c is at a certain level or higher. In other words, the jitter is lowered at such a reproducing power that makes the amplitude higher than a value.

Hence, in the optical output adjustment method according to the third embodiment, the high-frequency amplitude level c is monitored, and the reproducing power is controlled such that this high-frequency amplitude level c is at a predetermined threshold value or higher. By this optical output adjustment method, the jitter of the reproducing signal can be lowered. More specifically, as shown in FIG. 1(B), the high-frequency amplitude level c and the threshold value V2 are compared with each other, and the reproducing power is controlled such that the high-frequency amplitude level c is equal to or higher than a threshold value V2. In this manner, the reproducing power is adjusted within the low-jitter reproducing power ΔP, so the jitter of the reproducing signal can be lowered.

In the explanation to the optical output adjustment method according to the second embodiment, the output level of the light source is controlled, based on the amplitude level of a higher component of the reproducing signal of the shortest recording mark 2T. However, this embodiment is not limited hitherto. That is, the output level of the light source as described above may be controlled by monitoring the amplitude level of a high-frequency component of a reproducing signal having a recording mark having a different recording length. Even with use of recording marks having different recording lengths, it is possible to obtain such a reproducing power that lowers the jitter of the reproducing signal.

The jitter is lowered by thus obtaining a reproducing power which sets the high-frequency amplitude level to a certain level or higher because it is considered that an edge indicating switching of the polarity of the reproducing signal is obtained by a movement phenomenon of a magnetic wall generated by irradiation of a reproducing laser beam, in the DWDD reproducing method, and the amplitude level of the high-frequency component (edge component) of a reproducing signal is large at an optimal reproducing power while the jitter is lowered.

Next, explanation will be made of a fourth embodiment. In the fourth embodiment, a reproducing signal obtained by reproducing a magneto-optical disk is differentiated to obtain a differential signal, and the reproducing power is controlled such that the differential signal amplitude level is at a predetermined threshold value or higher, based on a result of comparison between the amplitude level (hereinafter called a differential signal amplitude level).

Figure 3A:
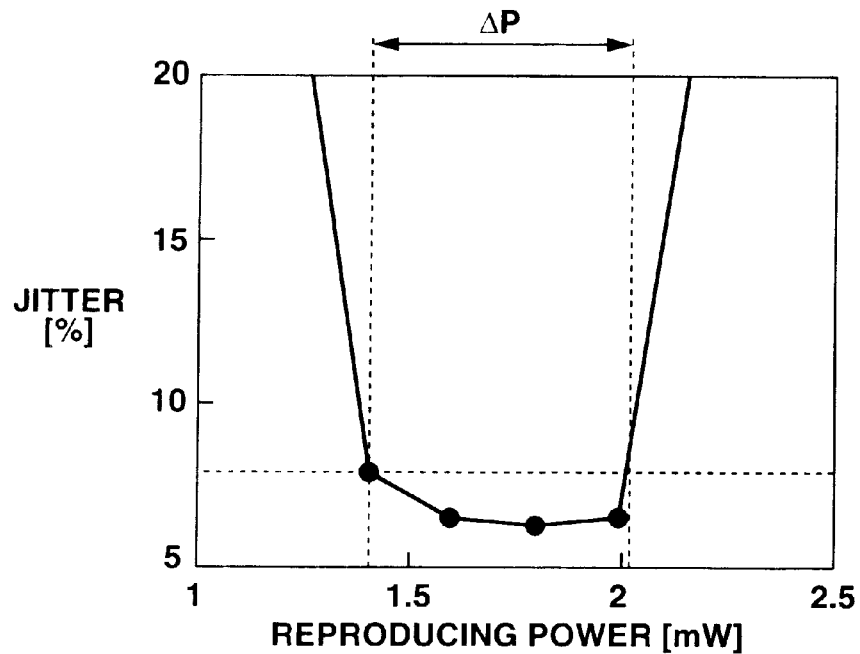
FIG. 3(A) and FIG. 3(B) are characteristic graphs used for explaining principles of an optical output adjustment method as an embodiment of the present invention and show relationships between the reproducing power, differential signal amplitude level, and jitter.
Figure 3B:
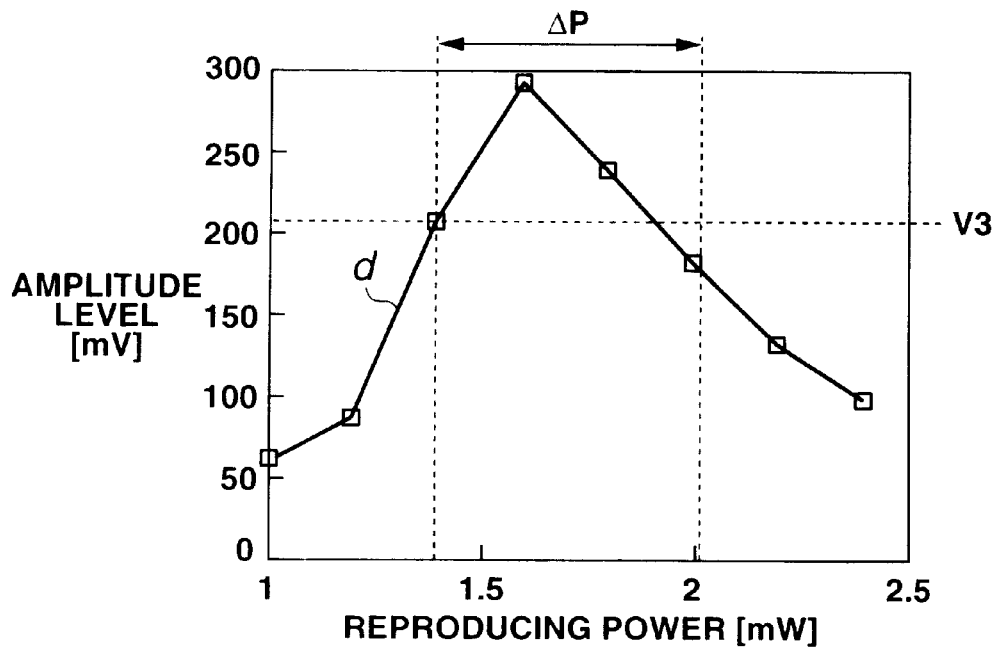

FIGS. 3 show a relationship among the reproducing power, the differential signal amplitude level d, and the jitter. FIG. 3(A) shows a relationship between the reproducing power shown in FIG. 1(A) and the jitter. FIG. 3(B) shows a relationship between the reproducing power and the differential signal amplitude level. As shown in this FIG. 3(B), at the low-jitter reproducing power ΔP, the differential signal amplitude level d is at a certain level or higher. In other words, the jitter is lowered at such a reproducing power that sets the differential signal amplitude level d higher than a certain value.

Hence, in the optical output adjustment method according to the fourth embodiment, the differential signal amplitude level d is monitored, and the reproducing power is controlled such that this differential signal amplitude level d is at a predetermined threshold value or higher. By this optical output adjustment method, the jitter of the reproducing signal can be lowered. More specifically, as shown in FIG. 3(B), the differential signal amplitude level d and the threshold value V3 are compared with each other, and the reproducing power is controlled such that the differential signal amplitude level d is equal to or higher than a threshold value V3. In this manner, the reproducing power is adjusted within the low-jitter reproducing power ΔP, so the jitter of the reproducing signal can be lowered.

The recording mark as a reference for the reproducing signal is not limited to a recording mark having a specific recording length. That is, even based on any differential signal amplitude level obtained by differentiating a reproducing signal having a recording mark having any recording length, it is possible to obtain such a reproducing power that lowers the jitter of the reproducing signal as described above.

The jitter is lowered by thus obtaining a reproducing power which sets the differential signal amplitude level to a certain level or higher because it is considered that an edge indicating switching of the polarity of the reproducing signal is obtained by a movement phenomenon of a magnetic wall generated by irradiation of a reproducing laser beam, in the DWDD reproducing method, and the amplitude level of the high-frequency component (edge component) of a reproducing signal is high at an optimal reproducing power while the jitter is lowered.

By the optical output adjustment methods according to the first to fourth embodiments, it is possible to lower the jitter of the reproducing signal.

In the output adjustment methods described above, the reproducing power is controlled, based on the reproducing signal of a recording mark recorded on a magneto-optical disk, i.e., the reproducing signal of data. However, a reproducing power adjustment pattern for controlling the reproducing power of a light source may be previously written in a predetermined area, and the reproducing power may be controlled, based on the reproducing signal of this reproducing power adjustment pattern.

The magneto-optical disk used in this case is a disk of a magnetic wall movement type in which magnetic wall movement detection reproducing method is adopted, data is written with recording marks having different lengths by a predetermined modulation method, and a pattern for adjusting the reproducing power is written into a reference area.

In the following, a plurality of examples will be cited with respect to a pattern for adjusting the reproducing power to be written into the reference area, and optical output adjustment methods will be explained as fifth to eighth embodiments.

In case where a reproducing power adjustment repetitive pattern constructed only by shortest marks is written in the reference area of the magneto-optical disk, the output level is set such that the amplitude level is equal to or higher than a predetermined threshold value, based on a result of comparison between the amplitude level of a power adjustment reproducing signal obtained by reproducing a reproducing power adjustment repetitive pattern and a predetermined threshold value, in the fifth optical output adjustment method.

The optical output adjustment method according to this fifth embodiment corresponds to the optical output adjustment method according to first embodiment. In the case of the first embodiment, the reproducing power is controlled, based on the shortest recording mark amplitude level obtained by reproducing the shortest recording mark constructing data. In contrast, in the optical output adjustment method according to the fifth embodiment, the reproducing power is controlled, based on the power adjustment amplitude level obtained by reproducing the reproducing power adjustment repetitive pattern constructed only by the shortest marks written without any relationship with data.

Also, in case where a reproducing power adjustment pattern constructed only by the first and second marks having different writing lengths is written in the reference area of the magneto-optical disk, the reproducing laser beam is set to an output level equal to or lower than the predetermined threshold value described above, based on a result of comparison between a predetermined threshold value and a difference value between the first and second amplitude levels of the first and second mark reproducing signals corresponding to the components of the first and second marks, in the sixth optical output adjustment method.

The optical output adjustment method according to this sixth embodiment corresponds to the optical output adjustment method according to the second embodiment described above. In the case of the optical output adjustment method according to the second embodiment, the reproducing power is controlled, based on the amplitude level difference value obtained by reproducing recording marks having different lengths which construct data. In contrast, in the optical output adjustment method according to the sixth embodiment, the reproducing power is controlled, based on the difference value of the amplitude level of the reproducing signal obtained by reproducing a reproducing power adjustment pattern constructed only by the first and second marks having different writing lengths which are not related with data.

Also, in case where a reproducing power adjustment repetitive pattern is written in the reference area of the magneto-optical disk, the reproducing laser beam is set to such an output that makes the amplitude level equal to or higher than a predetermined threshold value, based on a result of comparison between a predetermined threshold value and the amplitude level of the high-frequency reproducing signal consisting of a high-frequency component in the power adjustment reproducing signal obtained by reproducing the reproducing power adjustment repetitive pattern, in the optical output adjustment method according to the seventh embodiment.

The optical output adjustment method according to this seventh embodiment corresponds to the optical output adjustment method according to third embodiment described above. In the case of the third embodiment, the reproducing power is controlled, based on the amplitude level of the high-frequency reproducing signal in the reproducing signal obtained by reproducing data. In contrast, in the optical output adjustment method according to the seventh embodiment, the reproducing power is controlled, based on the amplitude level of the high-frequency reproducing signal consisting of a high-frequency component of the power adjustment reproducing signal obtained by reproducing the reproducing power adjustment repetitive pattern having no relationship with data.

Also, in case where a reproducing power adjustment pattern not limited to a repetitive pattern, i.e., a reproducing power adjustment pattern constructed by a plurality of marks having different writing lengths are written in the reference area of the magneto-optical disk, the reproducing laser beam is set to an output level which makes the amplitude level equal to or higher than a predetermined threshold value, based on a result of comparison between a predetermined threshold value and the amplitude level of a differential signal by differentiating the power adjustment reproducing signal obtained by reproducing the reproducing power adjustment pattern, in the optical output adjustment method according to the eighth embodiment.

The optical output adjustment method according to the eighth embodiment corresponds to the optical output adjustment method according to the fourth embodiment described above. In the case of the optical output adjustment method according to the fourth embodiment, the reproducing power is controlled, based on the differential signal amplitude level obtained by differentiating the reproducing signal obtained by reproducing data. In contrast, in the optical output adjustment method according to the eighth embodiment, the reproducing power is controlled, based on the differential signal amplitude level obtained by differentiating the power adjustment reproducing signal obtained by reproducing a reproducing power adjustment pattern which does not have any relationship with data.

The reproducing power can be rapidly set to an optimal level by reproducing a pattern prepared as for reproducing power adjustment in a reference area and by adjusting the reproducing power, based on the reproducing signal, like in the optical output adjustment methods according to the fifth to eighth embodiments.

The optical output adjustment methods according to the first to eight embodiment may be combined such that one of the optical output adjustment methods is selected depending on circumstances so as to control the reproducing power. In this manner, optimal control of the reproducing power can be carried out more effectively.

The optical output adjustment methods according to the embodiments described above will be explained next. For example, the optical output adjustment apparatus can be applied to an optical output adjustment apparatus for controlling the output level of the light source of a magneto-optical disk device which reproduces data by irradiating a laser beam onto a magneto-optical disk thereby to reproduce data.

Figure 4:
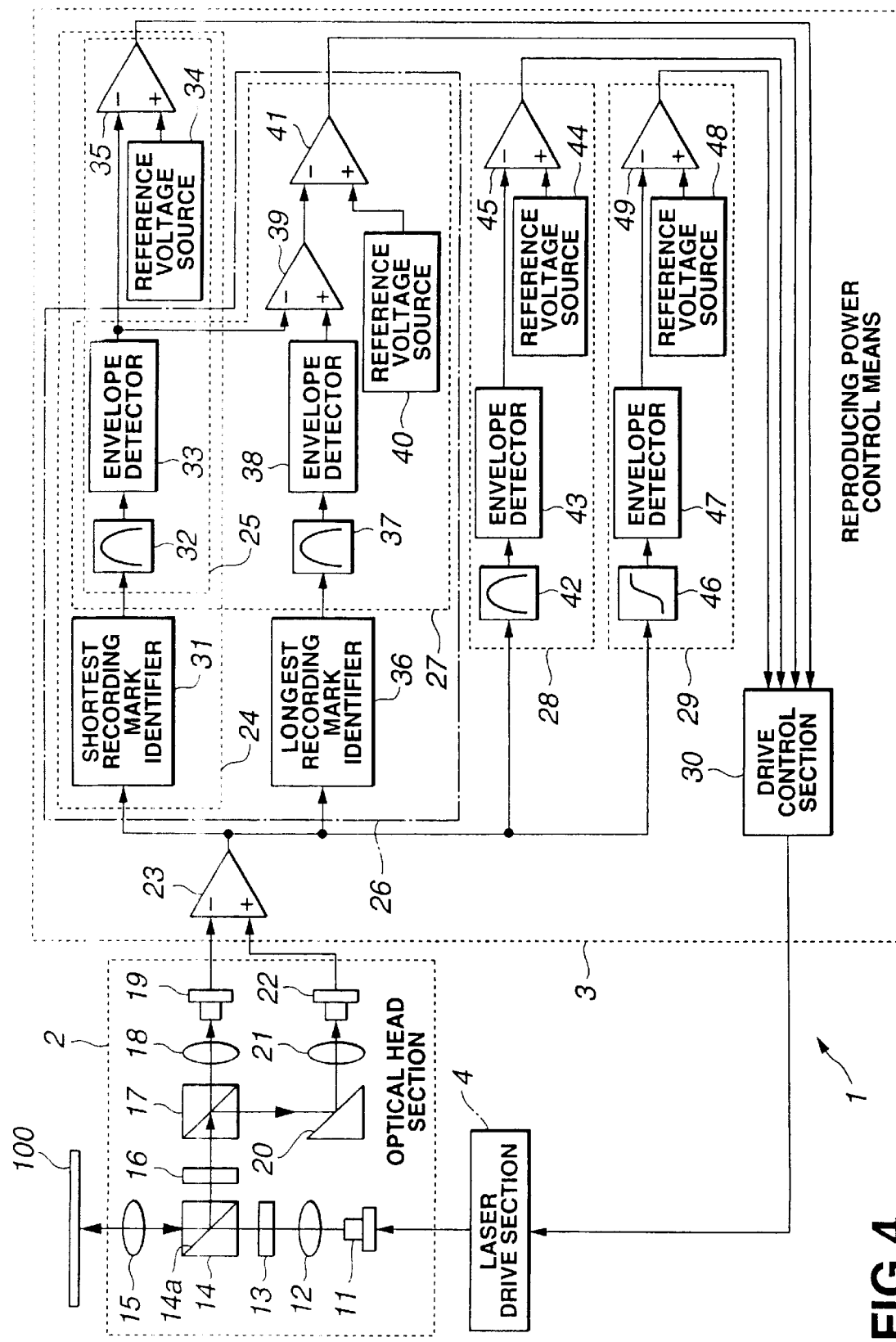
FIG. 4 is a block diagram showing the structure of a magneto-optical disk to which an optical output adjustment apparatus as an embodiment of the present invention is applied.

As shown in FIG. 4, a magneto-optical disk device 1 comprises an optical head section 2 which emits a laser beam from a semiconductor laser 11 as a light source to record and reproduce data onto and from a magneto-optical disk 100, a laser drive section 4 which drives which drives the semiconductor laser 11, and a reproducing power control section 3 which controls the laser drive section 4, where roughly classified. Here, the magneto-optical disk 100 onto and from which data is recorded and reproduced by the magneto-optical disk device 1 adopts a film structure to which the DWDD reproducing method. This magneto-optical disk 100 is supported and rotated by a magnet chuck or the like not shown.

The optical head section 2 comprises a semiconductor laser 11, a collimator lens 12, a grating lens 13, a beam splitter 14, an objective lens 15, a ½ wavelength plate 16, a deflection beam splitter 17, a convergence lenses 18 and 21, a deflection mirror 20, and first and second light receive sections 19 and 22.

In the optical head section 2 having a structure as described above, a laser beam is emitted from the semiconductor laser 11. Here, the semiconductor laser 11 emits a reproducing laser beam and a recording laser beam by making the output level differ between recording and reproducing. The output level of this semiconductor laser 11 is controlled by a drive control section 4.

The laser beam emitted from the semiconductor laser 11 is changed into parallel light by the collimator lens 12 and is irradiated onto the magneto-optical disk 100 through the grating 13, beam splitter 44, and objective lens 15.

The objective lens 14 is driven in the focusing direction and the tracking direction by an actuator not shown, and the laser beam is converged so as to form a focus on a desired track on the magneto-optical disk 100 by the objective lens 14 thus driven. The grating 13 functions to divide the beam to obtain a tracking error signal used for tacking control.

The laser beam converged on the magneto-optical disk 100 as described above is let enter, as reflection light, into the beam splitter through the objective lens 15.

The light path of the reflection light which is thus let enter into the beam splitter 14 is changed at a reflection surface 14a and is guided toward the ½ wavelength plate 16.

The ½ wavelength plate 16 and the deflection beam splitter 17 provided behind the plate 16 functions to separate and detect a change of the deflection light corresponding to magnetization of the magneto-optical disk 100. The reflection light is split into light fluxes traveling toward the convergence lens 18 and the deflection mirror 20 by the ½ wavelength plate 16 and the deflection beam splitter 21.

The light flux split and emitted to the side of the convergence lens 18 is converged by this convergence lens 18 and is received by the first light receive section 19. Meanwhile, the light flux split and emitted to the side of the deflection lens 20 is reflected toward the convergence lens 21 by the deflection lens 20 and is received by the second light receive section 21 through the deflection lens 20. For example, the light receive sections 19 and 22 are photo-detectors.

The light receive sections 19 and 22 output electric signals corresponding to the amounts of received light, and these electric signals are inputted to the reproducing power control section 3.

This reproducing power control means 3 is constructed so as to output a reproducing signal obtained by differentially detecting electric signals from the light receive sections 19 and 22 by a differential amplifier 23.

In the reproducing power control means 3, the output signal from the differential amplifier 23 is processed by a shortest recording mark identifier 31, a first band pass filter 32, a first envelope detector 33, and a first comparator 35, in this order, and is then outputted to a drive control section 30. Here, the first comparator 35 is inputted with a reference voltage from a first reference voltage source 34.

Also, in this reproducing power control means 3, the output signal from the differential amplifier 23 is processed by a longest recording mark identifier 36, a second band pass filter 37, a second envelope detector, and second and third comparator 39 and 41, in this order, and is then inputted to a drive control section 30. Here, the second comparator 39 is inputted with the output signal from the first envelope detector 33. Further, the third comparator 39 to which the output signal from the first envelope detector 33 is inputted is inputted with a reference voltage from a second reference voltage source 40.

Also, in the reproducing power control means 3, the output signal from the differential amplifier 23 is processed by a third band pass filter 42, a third envelope detector 43, and a fourth comparator 45, in this order, and is then inputted to a drive processing section 30. Here, the fourth comparator 45 is inputted with a reference voltage from a third reference voltage source 44.

Also, in the reproducing power control means 3, the output signal from the differential amplifier 23 is processed by a differentiator 46, a fourth envelope detector 47, and a fifth comparator 45, in this order, and is then inputted to the drive control section 30. Here, the fifth comparator 45 is inputted with a reference voltage from a fourth reference voltage source 44.

The reproducing power control means 3 constructed as described above comprises a reproducing power control section which practices the optical output adjustment methods as the first to eighth embodiments described above.

That is, a first reproducing power control section 24 is constructed by the shortest recording mark identifier 31, the first band pass filter 32, the first envelope detector 33, the first reference voltage source 34, and the first comparator 35, and this first reproducing power control section 24 is used as a reproducing power control section which practices the optical output adjustment method according to the first embodiment described previously.

Also, a second reproducing power control section is constructed by the first band pass filter 32, the first envelope detector 33, the first reference voltage source 34, and the first comparator 35, and this second reproducing power control section 24 is used as a reproducing power control section which practices the optical output adjustment method according to the fifth embodiment described previously.

The relationship between the first and second reproducing power control sections 24 and 25 is arranged such that the first reproducing power control section 24 controls the reproducing power, based on the recording mark recorded as data on the magneto-optical disk 100, and the second reproducing power control section 25 controls the reproducing power, based on the reproducing power adjustment pattern written in the reference area of the magneto-optical disk 100.

Also, a third reproducing power control section 26 is constructed by the shortest recording mark identifier 31, the longest recording mark identifier 36, the first and second band pass filters 32 and 37, the first and second envelope detector 33 and 38, and the second and third comparator 39 and 41, and this third reproducing power control section 26 is used as a reproducing power control section which practices the optical output adjustment method according to the second embodiment described previously.

Also, a fourth reproducing power control section 27 is constructed by the first and second band pass filters 32 and 37, the first and second envelope detector 33 and 38, and the second and third comparator 39 and 41, and this fourth reproducing power control section 27 is used as a reproducing power control section which practices the optical output adjustment method according to the sixth embodiment described previously.

The relationship between the third and fourth reproducing power control sections 26 and 27 is arranged such that the third reproducing power control section 26 controls the reproducing power, based on the recording mark recorded as data on the magneto-optical disk 100, and the fourth reproducing power control section 27 controls the reproducing power, based on the reproducing power adjustment pattern written in the reference area of the magneto-optical disk 100.

Also, a fifth reproducing power control section 28 is constructed by the third band pass filter 42, the third envelope detector 43, the third reference voltage source 44, and the fourth comparator 45, and this fifth reproducing power control section 28 is used as a reproducing power control section which practices the optical output adjustment method according to the seventh embodiment described previously.

Also, a sixth reproducing power control section 29 is constructed by the differentiator 46, the fourth envelope detector 47, the fourth reference voltage source 48, and the fifth comparator 49, and this sixth reproducing power control section 29 is used as a reproducing power control section which practices the optical output adjustment methods according to the fourth and eighth embodiments described previously.

The drive control section 30 controls the laser drive section 4, based on the processing results in the reproducing power control sections 24, 25, 26, 27, 28, and 29 constructed as described above. In the following, the first to sixth power control sections 24, 25, 26, 27, 28, and 29 will be specifically explained.

With respect to the first reproducing power control section 24, the reproducing signal from the differential amplifier 23 is inputted to the shortest recording mark identifier 31.

The shortest recording mark identifier 31 detects a shortest recording mark reproducing signal corresponding to the component of the shortest recording mark of a reproducing signal outputted from the differential amplifier 23. That is, the differential amplifier 23 described above and the shortest recording mark identifier 31 construct a reproducing signal detector means for detecting a shortest recording mark reproducing signal corresponding to the component of the shortest recording mark in the reproducing signal obtained by reproducing the magneto-optical disk 100. The shortest recording mark reproducing signal detected by the shortest recording mark identifier 31 is outputted to the first band pass filter 32.

The first band pass filter 32 allows a predetermined band of the frequency of the shortest recording mark reproducing signal to pass. The output of this first band pass.filter 32 is inputted to the first envelope detector 33.

The first envelope detector 33 is a signal amplitude level detector means for detecting the shortest recording mark amplitude level from the shortest recording mark reproducing signal. The shortest recording mark reproducing signal amplitude level detected by the first envelope detector 33 is inputted to the first comparator 35.

The first comparator 35 is a comparator means for comparing the shortest recording mark amplitude level with a predetermined threshold value. Specifically, the first comparator 35 compares the first reference voltage regarded as a predetermined threshold value outputted from the first reference voltage source 24 with the shortest recording mark amplitude level detected at the first envelope detector 33. The first reference voltage is a threshold value V1 shown in FIG. 1(B). Note that the output level of the first reference voltage source can be set variable by a control section not shown. The level determination result made by the first comparator 25 is inputted to the drive control section 30.

The drive control section 30 is an optical output control means which controls the reproducing power such that the shortest recording mark amplitude level is at the first reference voltage or higher, based on the comparison result of the first comparator 35. This drive control section 30 sets the reproducing power depending on the laser drive section 4, based on the comparison result described above, and the laser drive section 4 supplies a current to the semiconductor laser 11 such that the reproducing power thus set is attained.

In the first reproducing power control section 24 constructed as described above, the first reference voltage at which a signal can be reproduced with a lowered jitter is set in the first reference voltage source 34, and the reproducing power is adjusted until the shortest recording mark amplitude level is determined to be greater than the first reference voltage by the first comparator 35. Since the magneto-optical disk device 1 comprises this first reproducing power control section 24, the jitter of the reproducing signal can be lowered.

Although the first band pass filter is not always indispensable to the first reproducing power control section 24, S/N of the shortest recording mark reproducing signal can be improved by making the shortest recording mark reproducing signal pass through the first band pass filter 32.

Explained next will be the second reproducing power control section 25. The second reproducing power control section 25 controls the reproducing power, based on the reproducing power adjustment repetitive pattern constructed only by shortest recording marks written on the reference area of the magneto-optical disk 100.

The second reproducing power control section 25 is constructed as not including the shortest recording mark identifier 31 of the above-described first reproducing power control section 24 at the input stage. This is because the second power control section 25 controls the reproducing power, based on the reproducing signal of the reproducing power adjustment repetitive pattern written in the reference area of the magneto-optical disk 100, in contrast to the first reproducing power control section 24 which controls the reproducing power, based on the shortest recording mark reproducing signal detected by the shortest recording mark identifier 31.

In the second reproducing power control section 25 thus constructed, the differential amplifier 23 functions as a reproducing signal detector means which detects the power adjustment reproducing signal obtained by reproducing the reproducing power adjustment repetitive pattern.

Also, the first envelope detector 33 functions as a signal amplitude level detector means which detects the amplitude level of the power adjustment reproducing signal, and the first comparator 35 functions as a comparator means which compares the amplitude level detected by the first envelope detector 33 with the second reference voltage outputted by the reference voltage source 34.

By using the second reproducing power control section 25 as a control section for the reproducing power, the reproducing power can be rapidly adjusted to an optimal level.

To realize the structure of the second reproducing power control section 25 while maintaining the structure of the first power control section 24, the power adjustment reproducing signal from the differential amplifier 23 needs to be inputted directly to the first band pass filter 32. This is enabled, for example, by arranging the shortest recording mark identifier 31 to have a switch function. In this case, when adjusting the reproducing power by the first reproducing power control section 24, the switch is turned on thereby to enable identification of the shortest recording mark at the shortest recording mark identifier 31. Also, when adjusting the reproducing power by the second reproducing power control section 25, the switch is turned off, so that the power adjustment reproducing signal from the differential amplifier 23 is not processed at the shortest recording mark identifier 31 but is inputted to the band pass filter 32.

Figure 5:
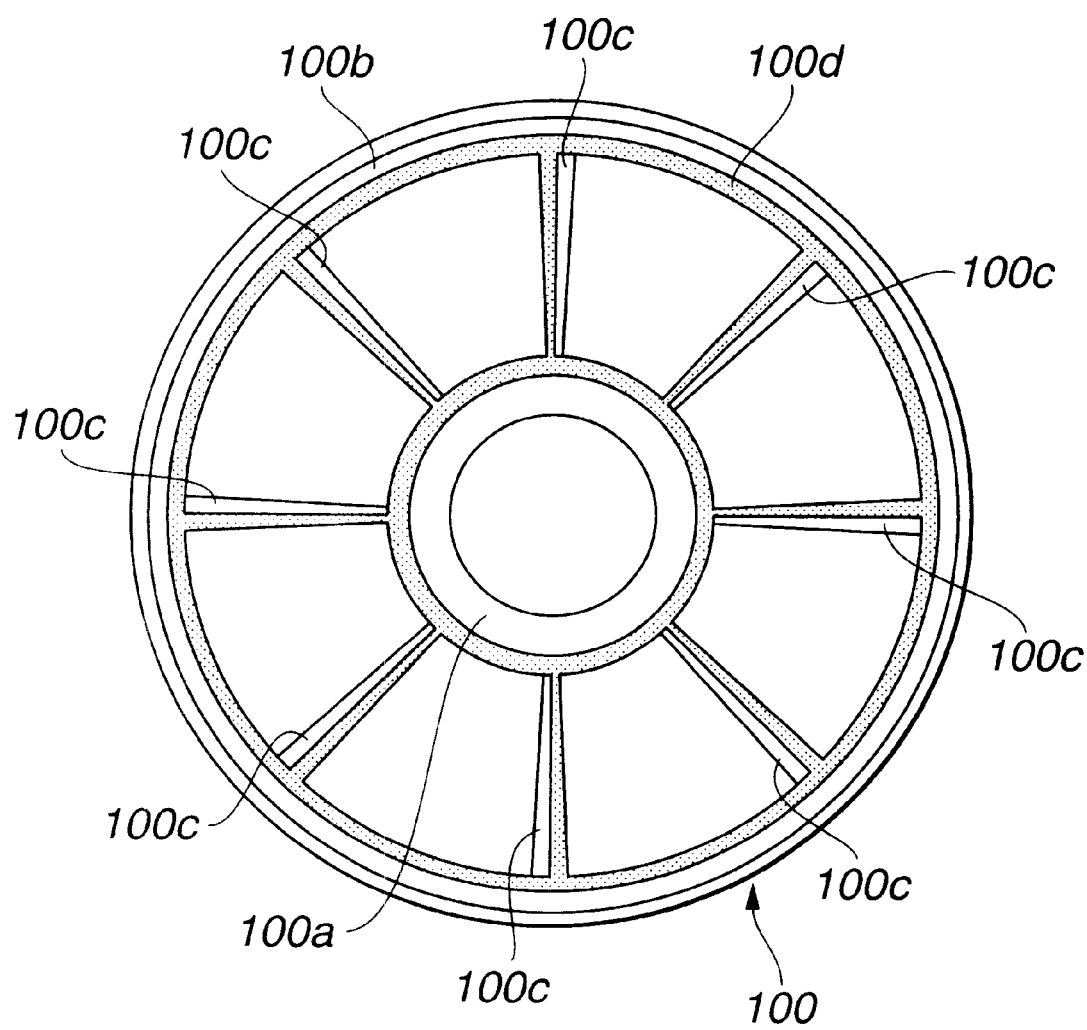
FIG. 5 is a plan view showing a magneto-optical disk having a reference area where a pattern for reproducing power adjustment is written.

FIG. 5 shows a specific example of a magneto-optical disk 100 on which a reference area is formed. In a normal magneto-optical disk, initial information of the disk is provided in a read-in are 100a provided on the inner circumference or a read-out area 100b provided on the outer circumference. A reference area where a pattern for reproducing power adjustment is recorded can be provided in this read-in area 100a or the read-out area 100b. Also, recording of data is normally carried out in units of sectors or tracks, and address areas where addresses for specifying sector positions and track positions are recorded are provided at various portions on the magneto-optical disk 100. The magneto-optical disk 100 shown in FIG. 5 is an example which is constructed by adopting a CΔV (Constant Angular Velocity) method, and address areas 100c are arranged radially. For example, reference areas can be provided adjacent to the address areas 100. In the magneto-optical disk 100 shown in FIG. 5, the hatched area can be considered as reference areas.

Next, explanation will be made of the third reproducing power control section 26. This third reproducing power control section 26 comprises the shortest recording mark identifier 31, the first band pass filter 32, and the first envelope detector 32 which construct the first reproducing power control section 24. Also, the third reproducing power control section 26 comprises the longest recording mark identifier 36, the second band pass filter 37, the second envelope detector 38, the second and third comparators 39 and 41, and the second reference voltage source 40. In the third reproducing power control section 26, the respective components function as follows.

The shortest recording mark identifier 31 together with the differential amplifier 23 functions as a first reproducing signal detector means for detecting the shortest recording mark corresponding to the component of the shortest recording mark in the reproducing signal obtained by reproducing the magneto-optical disk 100. The longest recording mark identifier 36 functions as a second reproducing signal detector means for detecting the longest recording mark reproducing signal corresponding to the component of the longest recording mark as a second recording mark having a length different from that of the first recording mark in the reproducing signal obtained by reproducing the magneto-optical disk 100.

Also, the first envelope detector 33 functions as a first signal amplitude level detector means for detecting the shortest recording mark amplitude level. The second envelope detector functions as a second signal amplitude level detector for detecting the longest recording mark amplitude level.

Further the second comparator 39 functions as a difference value calculator means for calculating the difference value between the shortest recording mark amplitude level and the longest recording mark amplitude level. The third comparator 41 functions as a comparator means for comparing the difference value obtained by the second comparator 39 with a predetermined threshold value.

In this third reproducing power control section 26, the shortest recording mark reproducing signal is processed by the shortest recording mark identifier 31, the first band pass filter 32, and the fist envelope detector 32, and the longest recording mark reproducing signal is processed by the longest recording mark identifier 36, the second band pass filter 37, and the second envelope detector 38.

That is, in the third reproducing power control section 26, the shortest recording mark reproducing signal is detected from the reproducing signal from the differential amplifier 23 by the longest recording mark identifier 31, and the first band pass filter 32 allows a predetermined band of the frequency of shortest recording mark reproducing signal to pass. The shortest recording mark amplitude level is then detected by the first envelope detector 33. Further, the amplitude level of this longest recording m-ark reproducing signal is inputted to the second comparator 39. Meanwhile, in the third reproducing power control section 26, the longest recording mark reproducing signal is reproduced from the reproducing signal from the differential amplifier 23 by the longest recording mark identifier 36, and the second band pass filter 37 allows a predetermined band of the frequency of the shortest recording mark reproducing signal to pass. The longest recording mark amplitude level is then detected by the second envelope detector 38. Further, the amplitude level of this longest recording mark reproducing signal is inputted to the second comparator 39.

The second comparator 39 which is inputted with the shortest recording mark amplitude level and the longest recording mark amplitude level outputs a difference value between the shortest and longest mark amplitude levels, to the third comparator 41.

The third comparator 41 compares the third reference voltage used as a predetermined threshold value outputted from the second reference voltage source 24, with the difference value (difference voltage) of the second comparator 39. The second reference voltage is a threshold value $\Delta V$ as shown in FIG. 1(B). Note that the output level of the second reference voltage source 40 can be set variable by a control section not shown. The magnitude determination result by the third comparator 41 is inputted to the drive control section 30.

The drive control section 30 sets the reproducing power in the laser drive section 4, based on the comparison result from the third comparator 41. The laser drive section 4 supplies the semiconductor laser 11 with a current such that the set reproducing power is obtained.

The third power control section 26 constructed as described above sets the third reference voltage capable of reproducing a signal with a lowered jitter, in the second reference voltage source, and the reproducing power can be adjusted by the drive control section 30 until the difference value described above is increased to be higher than the third reference voltage by the third comparator 41. Since the magneto-optical disk device 1 comprises this third reproducing power control section 26, the jitter of the reproducing signal can be lowered.

Explained next will be the fourth power control section 27. The fourth reproducing power control section 27 controls the reproducing power, based on the reproducing power adjustment pattern constructed only by the shortest and longest recording marks as first and second marks written in the reference area of the magneto-optical disk 100. Note that the reproducing power adjustment pattern may be or need not be a repetitive pattern.

The fourth reproducing power control section 27 is constructed as not including the shortest recording mark identifier 31 and the longest recording mark identifier 36 of the above-described third reproducing power control section 26 at the input stage. This is because the third power control section 26 controls the reproducing power, based on the reproducing signal of the reproducing power adjustment pattern written in the reference area of the magneto-optical disk 100, in contrast to the third reproducing power control section 27 which controls the reproducing power, based on the shortest and longest recording mark reproducing signals detected by the shortest and longest recording mark identifiers 31 and 36.

In the fourth reproducing power control section 25 thus constructed, the differential amplifier 23 functions as a reproducing signal detector means which detects the shortest recording mark reproducing signal corresponding to the component of the shortest recording mark and the longest recording mark reproducing signal corresponding to the component of the longest recording mark, in the power adjustment reproducing signal obtained by reproducing the reproducing power adjustment pattern.

Also, the first and second envelope detectors 33 and 38 function as signal amplitude level detector means which detect the shortest and longest recording mark amplitude levels, and the second comparator 39 functions as a difference value calculator means for calculating a difference value between the shortest and longest recording mark amplitude levels. The third comparator 41 functions as a comparator means which compares the difference value described above with the fourth reference voltage outputted by the second reference voltage source 40.

By using the fourth reproducing power control section 27 as a control section for the reproducing power, the reproducing power can be rapidly adjusted to an optimal level.

To realize the structure of the fourth reproducing power control section 27 while maintaining the structure of the third power control section 26, the power adjustment reproducing signal from the differential amplifier 23 needs to be inputted directly to the first band pass filter 32. This is enabled, for example, by arranging the shortest and longest recording mark identifiers 31 and 36 to have witch functions, like the second reproducing power control section 25 described previously.

Next, explanation will be made of the fifth reproducing power control section 28. This fifth reproducing power control section 28 is constructed so as to control the reproducing power by detecting the high-frequency component from the reproducing signal from the magneto-optical disk 100. This fifth reproducing power control section 28 is constructed in consideration of the point that the high-frequency component contained in the reproducing signal can be specified by the band pass filter and the reproducing power can be adjusted, based on the high-frequency component of the reproducing signal.

The fifth reproducing power control section 28 comprises the third band pass filter 42, the third envelope detector 47, the third reference voltage source 48, and the fourth comparator 45. In this fifth reproducing power control section 28, the respective components function as follows.

The third band pass filter 42 functions as a reproducing signal detector means which detects a high-frequency reproducing signal consisting of a high-frequency component in the reproducing signal obtained by reproducing the magneto-optical disk, together with the differential amplifier.

Also, the third envelope detector 43 functions as a signal amplitude level detector means for detecting the high-frequency amplitude level as the amplitude level of the high-frequency reproducing signal.

Further, the fourth comparator 45 functions as a comparator means for comparing the high-frequency amplitude level with the fifth reference voltage as a predetermined threshold value outputted from the third reference voltage source 44.

In the reproducing power control section 28 constructed in this structure, a predetermined frequency band of the frequency of the reproducing signal from the differential amplifier 23 is allowed to pass by the third band pass filter 42, and the high-frequency amplitude level is detected by the third envelope detector 43. Further, by the fourth comparator 45, the high-frequency amplitude level detected by the third envelope detector 43 is compared with the fifth reference voltage. Here, the fifth reference voltage is a threshold value V2 as shown in FIG. 1(B).

The drive control section 30 sets the reproducing power in the laser drive section 4, based on the comparison result from the fourth comparator 45. The laser drive section 4 supplies the semiconductor laser 11 with a current such that the set reproducing power is obtained.

The fifth power control section 28 constructed as described above sets the third reference voltage capable of reproducing a signal with a lowered jitter, in the third reference voltage source 44, and the reproducing power is adjusted by the drive control section 30 until the difference value described above is increased to be higher than the fifth reference voltage by the fourth comparator 45. Since the magneto-optical disk device 1 comprises this fifth reproducing power control section 28, the jitter of the reproducing signal can be lowered.

The fifth power control section 28 can also detect the high-frequency component of the shortest recording mark reproducing signal corresponding to the component of the shortest recording mark in the reproducing signal obtained by reproducing the magneto-optical disk 100.

Further, the fifth reproducing power control section 28 can adjust the reproducing power, based on the pattern for power adjustment which is written in the reference area of the magneto-optical disk 100. That is, the fifth reproducing power control section 28 can adjust the reproducing power, based on a comparison result obtained by comparing the amplitude level of the high-frequency reproducing signal consisting of a high-frequency component in the power adjustment reproducing signal obtained by reproducing the power reproducing pattern written in the reference area, with the sixth reference voltage outputted by the third reference voltage source 44. Further, in this case, the band of the signal which is allowed to pass by the third band pass filter 42 can be limited by constructing the reproducing power adjustment pattern written in the reference area, only by specific marks, i.e., by preparing a repetitive pattern constructed only by the shortest marks. S/N can be reduced by thus limiting the signal pass band of the third band pass filter 42.

Next, explanation will be made of the sixth reproducing power control section 29. This sixth reproducing power control section 29 comprises the differentiator 46, the fourth envelope detector 47, the fourth reference voltage source 48, and the fifth comparator 49.

The differentiator 46 together with the differential amplifier 23 constructs a differentiator means which differentiates the reproducing signal obtained by reproducing the magneto-optical disk and outputs a differential signal.

The fourth envelope detector 47 functions as a signal amplitude level detector means which detects the differential signal amplitude level as the amplitude level of the differential signal.

The fourth comparator 49 functions as a comparator means which compares the differential amplitude level with the seventh reference voltage used as a predetermined threshold value outputted from the fourth reference voltage source 48.

The sixth power control section 29 constructed as described above sets the seventh reference voltage capable of reproducing a signal with a lowered jitter, in the fourth reference voltage source, and the reproducing power is adjusted by the drive control section 30 until the differential signal amplitude level is increased to be higher than the seventh reference voltage by the fourth comparator 49. Since the magneto-optical disk device 1 comprises this sixth reproducing power control section 29, the jitter of the reproducing signal can be lowered.

Also, the sixth reproducing power control section 29 can adjust the reproducing power, based on the pattern for power adjustment, which is written in the reference area of the magneto-optical disk 100. That is, in this case, the sixth reproducing power control section 29 can adjust the reproducing power, based on a comparison result obtained by comparing the amplitude level of the differential signal obtained by differentiating the power adjustment reproducing signal obtained by reproducing the power reproducing pattern written in the reference area, with the eighth reference voltage outputted by the third reference voltage source.

The magneto-optical disk device 1 is capable of controlling the reproducing power to an optimal level, by the reproducing power control means 3 comprising the first to sixth reproducing power control sections 24, 25, 26, 27, 28, and 29 as described above.

In this manner, the magneto-optical disk device 1 can set an optimal reproducing power which is capable of reproducing a signal excellently even if there are temperature changes and variants between magneto-optical disks in the DWDD reproducing method.

The reproducing power control means 3 can make the first to sixth reproducing power control sections 24, 25, 26, 27, 28, and 29 function singly or in combination with each other. Further, in case where the first to sixth reproducing power control sections are used in combination, the reproducing power can be controlled to a more optimal reproducing power by selecting reproducing power control sections in compliance with the situation.

Also, the magneto-optical disk can comprise a power adjustment pattern writer means for writing a pattern for reproducing power adjustment. As a result of this, the magneto-optical disk device 1 can always control the reproducing power, based on the pattern for reproducing power adjustment which is written in the reference area. For example, in this case, the pattern for reproducing power adjustment is written into the reference area while determining the length with which the mark is written and whether or not the pattern is repetitive.

An optical output adjustment apparatus according to the present invention comprises: a light source for emitting the reproducing laser beam; reproducing signal detector means for detecting a shortest recording mark reproducing signal corresponding to a component of a shortest recording mark in a reproducing signal obtained by reproducing the magneto-optical information recording medium; signal amplitude level detector means for detecting an amplitude level of the shortest recording mark reproducing signal; comparator means for comparing the amplitude level with a predetermined threshold value; and optical output control means for adjusting the reproducing laser beam to an output level which makes the amplitude level equal to or higher than the predetermined threshold value. Therefore, the reproducing laser beam can be set to an output level at which a reproducing signal with a lowered jitter can be obtained.

Also, in an optical output adjustment method according to the present invention, based on a comparison result between a predetermined threshold value and an amplitude level of a shortest recording mark reproducing signal corresponding to a component of a shortest recording mark in a reproducing signal obtained by reproducing the magneto-optical information recording medium, the reproducing laser beam is adjusted to an output level which makes the amplitude level equal to or higher than the predetermined threshold value. Therefore, the reproducing laser beam can be set to an output level at which a reproducing signal with a lowered jitter can be obtained.

Also, an optical output adjustment apparatus according to the present invention comprises: a light source for emitting the reproducing laser beam; first reproducing signal detector means for detecting a first recording mark reproducing signal corresponding to a component of a first recording mark in a reproducing signal obtained by reproducing the magneto-optical information recording medium; second reproducing signal detector means for detecting a second recording mark reproducing signal corresponding to a component of a second recording mark in a reproducing signal obtained by reproducing the magneto-optical information recording medium; first signal amplitude level detector means for detecting a first amplitude level of the first recording mark reproducing signal; second signal amplitude level detector means for detecting a second amplitude level of the second recording mark reproducing signal; difference value calculator means for calculating a difference value between the first and second amplitude levels; comparator means for comparing the amplitude level with a predetermined threshold value; and optical output control means for adjusting the reproducing laser beam to an output level which makes the amplitude level equal to or lower than the predetermined threshold value. Therefore, the reproducing laser beam can be set to an output level at which a reproducing signal with a lowered jitter can be obtained.

Also, in an optical output adjustment method according to the present invention, based on a comparison result between a threshold value and a difference value between first and second amplitude levels of first and second recording mark reproducing signals corresponding to components of first and second recording marks having lengths different from each other in a reproducing signal obtained by reproducing the magneto-optical information recording medium, the reproducing laser beam is adjusted to an output level which makes the amplitude level equal to or lower than the predetermined threshold value. Therefore, the reproducing laser beam can be set to an output level at which a reproducing signal with a lowered jitter can be obtained.

Also, an optical output adjustment apparatus according to the present invention comprises: a light source for emitting the reproducing laser beam; reproducing signal detector means for detecting a high-frequency reproducing signal consisting of a high-frequency component in a reproducing signal obtained by reproducing the magneto-optical information recording medium; signal amplitude level detector means for detecting an amplitude level of the high-frequency reproducing signal; comparator means for comparing the amplitude level with a predetermined threshold value; and optical output control means for adjusting the reproducing laser beam to an output level which makes the amplitude level equal to or higher than the predetermined threshold value. Therefore, the reproducing laser beam can be set to an output level at which a reproducing signal with a lowered jitter can be obtained.

Also, in an optical output adjustment method according to the present invention, based on a comparison result between a predetermined threshold value and an amplitude level of a high-frequency reproducing signal of a high-frequency component in a reproducing signal obtained by reproducing the magneto-optical information recording medium, the reproducing laser beam is adjusted to an output level which makes the amplitude level equal to or higher than the predetermined threshold value. Therefore, the reproducing laser beam can be set to an output level at which a reproducing signal with a lowered jitter can be obtained.

Also, an optical output adjustment apparatus according to the present invention comprises: a light source for emitting the reproducing laser beam; differentiator means for differentiating a reproducing signal obtained by reproducing the magneto-optical information recording medium, thereby to output a differential signal; signal amplitude level detector means for detecting an amplitude level of the differential signal; comparator means for comparing the amplitude level with a predetermined threshold value; and optical output control means for adjusting the reproducing laser beam to an output level which makes the amplitude level equal to or higher than the predetermined threshold value. Therefore, the reproducing laser beam can be set to an output level at which a reproducing signal with a lowered jitter can be obtained.

Also, in an optical output adjustment method according to the present invention, based on a comparison result between a predetermined threshold value and an amplitude level of a differential signal obtained by differentiating a reproducing signal obtained by reproducing the magneto-optical information recording medium, the reproducing laser beam is adjusted to an output level which makes the amplitude level equal to or higher than the predetermined threshold value. Therefore, the reproducing laser beam can be set to an output level at which a reproducing signal with a lowered jitter can be obtained.

Also, an optical output adjustment apparatus according to the present invention comprises: a light source for emitting the reproducing laser beam; reproducing signal detector means for detecting a power adjustment reproducing signal obtained by reproducing the reproducing power adjustment repetitive pattern; signal amplitude level detector means for detecting an amplitude level of the power adjustment reproducing signal; comparator means for comparing the amplitude level with a predetermined threshold value; and optical output control means for adjusting the reproducing laser beam to an output level which makes the amplitude level equal to or higher than the predetermined threshold value. Therefore, the reproducing laser beam can be set to an output level at which a reproducing signal with a lowered jitter can be obtained.

Also, in an optical output adjustment method according to the present invention, based on a comparison result between a predetermined threshold value and an amplitude level of a power adjustment reproducing signal obtained by reproducing the reproducing power adjustment repetitive pattern, the reproducing laser beam is adjusted to an output level which makes the amplitude level equal to or higher than the predetermined threshold value. Therefore, the reproducing laser beam can be set to an output level at which a reproducing signal with a lowered jitter can be obtained.

Also, an optical output adjustment apparatus according to the present invention comprises: a light source for emitting the reproducing laser beam; first reproducing signal detector means for detecting a first mark reproducing signal corresponding to a component of the first mark in a power adjustment reproducing signal obtained by reproducing the reproducing power adjustment pattern; second reproducing signal detector means for detecting a second mark reproducing signal corresponding to a component of the second mark in a power adjustment reproducing signal obtained by reproducing the reproducing power adjustment pattern; first signal amplitude level detector means for detecting an amplitude level of the first mark reproducing signal; second signal amplitude level detector means for detecting an amplitude level of the second mark reproducing signal; difference value calculator means for calculating a difference value between the first and second amplitude levels; comparator means for comparing the difference value with a predetermined threshold value; and optical output control means for adjusting the reproducing laser beam to an output level which makes the amplitude level equal to or lower than the predetermined threshold value. Therefore, the reproducing laser beam can be set to an output level at which a reproducing signal with a lowered jitter can be obtained.

Also, in an optical output adjustment method according to the present invention, based on a comparison result between a predetermined threshold value and a difference value between first and second amplitude levels of first and second mark reproducing signals corresponding to components of the first and second marks obtained by reproducing the reproducing power adjustment pattern. Therefore, the reproducing laser beam can be set to an output level at which a reproducing signal with a lowered jitter can be obtained.

Also, an optical output adjustment apparatus according to the present invention comprises: a light source for emitting the reproducing laser beam; reproducing signal detector means for detecting a high-frequency component in a power adjustment reproducing signal obtained by reproducing the reproducing power adjustment repetitive pattern; signal amplitude level detector means for detecting an amplitude level of the high-frequency reproducing signal; comparator means for comparing the amplitude level with a predetermined threshold value; and optical output control means for adjusting the reproducing laser beam to an output level which makes the amplitude level equal to or higher than the predetermined threshold value. Therefore, the reproducing laser beam can be set to an output level at which a reproducing signal with a lowered jitter can be obtained.

Also, in an optical output adjustment method according to the present invention, based on a comparison result between a predetermined threshold value and an amplitude level of a high-frequency reproducing signal consisting of a high-frequency component in a power adjustment reproducing signal obtained by reproducing the reproducing power adjustment repetitive pattern, the reproducing laser beam is adjusted to an output level which makes the amplitude level equal to or higher than the predetermined threshold value. Therefore, the reproducing laser beam can be set to an output level at which a reproducing signal with a lowered jitter can be obtained.

Also, an optical output adjustment apparatus according to the present invention comprises: a light source for emitting the reproducing laser beam; differentiator means for differentiating a power adjustment reproducing signal obtained by reproducing the reproducing power adjustment pattern, thereby to output a differential signal; signal amplitude level detector means for detecting an amplitude level of the differential signal; comparator means for comparing the amplitude level with a predetermined threshold value; and optical output control means for adjusting the reproducing laser beam to an output level which makes the amplitude level equal to or higher than the predetermined threshold value.

Also, in an optical output adjustment method according to the present invention, based on a comparison result between a predetermined threshold value and an amplitude level of a differential signal obtained by differentiating a power adjustment reproducing signal obtained by reproducing the reproducing power adjustment pattern, the reproducing laser beam is adjusted to an output level which makes the amplitude level equal to or higher than the predetermined threshold value. Therefore, the reproducing laser beam can be set to an output level at which a reproducing signal with a lowered jitter can be obtained.

What is claimed is:

1. An optical output adjustment apparatus for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data, wherein the optical output adjustment apparatus comprises:

a light source for emitting the reproducing laser beam;

reproducing signal detector means for detecting a shortest recording mark reproducing signal corresponding to a component of a shortest recording mark in a reproducing signal obtained by reproducing the magneto-optical information recording medium;

signal amplitude level detector means for detecting an amplitude level of the shortest recording mark reproducing signal;

comparator means for comparing the amplitude level with a predetermined threshold value; and optical output control means for adjusting the reproducing laser beam to an output level which makes the amplitude level higher than the predetermined threshold value.

2. An optical output adjustment method for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data, wherein based on a comparison result between a predetermined threshold value and an amplitude level of a shortest recording mark reproducing signal corresponding to a component of a shortest recording mark in a reproducing signal obtained by reproducing the magneto-optical information recording medium, the reproducing laser beam is adjusted to an output level which makes the amplitude level higher than the predetermined threshold value.

3. An optical output adjustment apparatus for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data, wherein the optical output adjustment apparatus comprises:

a light source for emitting the reproducing laser beam;

first reproducing signal detector means for detecting a first recording mark reproducing signal corresponding to a component of a first recording mark in a reproducing signal obtained by reproducing the magneto-optical information recording medium;

second reproducing signal detector means for detecting a second recording mark reproducing signal corresponding to a component of a second recording mark in a reproducing signal obtained by reproducing the magneto-optical information recording medium;

first signal amplitude level detector means for detecting a first amplitude level of the first recording mark reproducing signal;

second signal amplitude level detector means for detecting a second amplitude level of the second recording mark reproducing signal;

difference value calculator means for calculating a difference value between the first and second amplitude levels;

comparator means for comparing the difference value with a predetermined threshold value; and optical output control means for adjusting the reproducing laser beam to an output level which makes the difference value lower than the predetermined threshold value.

4. An apparatus according to claim 3, wherein the first recording mark is a shortest recording mark and the second recording mark is a longest recording mark.

5. An optical output adjustment method for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data, wherein based on a comparison result between a threshold value and a difference value between first and second amplitude levels of first and second recording mark reproducing signals corresponding to components of first and second recording marks having lengths different from each other in a reproducing signal obtained by reproducing the magneto-optical information recording medium, the reproducing laser beam is adjusted to an output level which makes the difference value lower than the predetermined threshold value.

6. A method according to claim 5, wherein the first recording mark is a shortest recording mark and the second recording mark is a longest recording mark.

7. An optical output adjustment apparatus for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data, wherein the optical output adjustment apparatus comprises:

a light source for emitting the reproducing laser beam;

differentiator means for differentiating a reproducing signal obtained by reproducing the magneto-optical information recording medium, thereby to output a differential signal;

signal amplitude level detector means for detecting an amplitude level of the differential signal;

comparator means for comparing the amplitude level with a predetermined threshold value; and optical output control means for adjusting the reproducing laser beam to an output level which makes the amplitude level higher than the predetermined threshold value.

8. An optical output adjustment method for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data, wherein based on a comparison result between a predetermined threshold value and an amplitude level of a differential signal obtained by differentiating a reproducing signal obtained by reproducing the magneto-optical information recording medium, the reproducing laser beam is adjusted to an output level which makes the amplitude level higher than the predetermined threshold value.

9. An optical output adjustment apparatus for adjusting an output level of a reproducing laser beam, in a signal reproducing device which adopts a magnetic wall movement detection reproducing method, irradiates the reproducing laser beam onto a magneto-optical information recording medium on which data is recorded on a data area by recording marks having different recording lengths according to a predetermined modulation method and a reproducing power adjustment repetitive pattern constructed only by shortest marks is written in a reference area, and magnifies a magnetic sector by magnetic wall movement, thereby to perform reproducing of the data, wherein the optical output adjustment apparatus comprises:

a light source for emitting the reproducing laser beam;

reproducing signal detector means for detecting a power adjustment reproducing signal obtained by reproducing the reproducing power adjustment repetitive pattern;

signal amplitude level detector means for detecting an amplitude level of the power adjustment reproducing signal;

comparator means for comparing the amplitude level with a predetermined threshold value; and optical output control means for adjusting the reproducing laser beam to an output level which makes the amplitude level higher than the predetermined threshold value.

10. An apparatus according to claim 9, wherein the optical output adjustment apparatus further comprises power adjustment repetitive pattern writing means for writing the power adjustment repetitive pattern into the reference area.

11. An optical output adjustment method for adjusting an output level of a reproducing laser beam, in a signal reproducing device which adopts a magnetic wall movement detection reproducing method, irradiates the reproducing laser beam onto a magneto-optical information recording medium on which data is recorded on a data area by recording marks having different recording lengths according to a predetermined modulation method and a reproducing power adjustment repetitive pattern constructed only by shortest marks is written in a reference area, and magnifies a magnetic sector by magnetic wall movement, thereby to perform reproducing of the data, wherein based on a comparison result between a predetermined threshold value and an amplitude level of a power adjustment reproducing signal obtained by reproducing the reproducing power adjustment repetitive pattern, the reproducing laser beam is adjusted to an output level which makes the amplitude level higher than the predetermined threshold value.

12. A method according to claim 11, wherein the power adjustment repetitive pattern is written in the reference area.

13. An optical output adjustment apparatus for adjusting an output level of a reproducing laser beam, in a signal reproducing device which adopts a magnetic wall movement detection reproducing method, irradiates the reproducing laser beam onto a magneto-optical information recording medium on which data is recorded in a data area by recording marks having different recording lengths according to a predetermined modulation method and a reproducing power adjustment pattern constructed only by first and second marks having different lengths is written in a reference area, and magnifies a magnetic sector by magnetic wall movement, thereby to perform reproducing of the data, wherein the optical output adjustment apparatus comprises:

a light source for emitting the reproducing laser beam;

first reproducing signal detector means for detecting a first mark reproducing signal corresponding to a component of the first mark in a power adjustment reproducing signal obtained by reproducing the reproducing power adjustment pattern;

second reproducing signal detector means for detecting a second mark reproducing signal corresponding to a component of the second mark in a power adjustment reproducing signal obtained by reproducing the reproducing power adjustment pattern;

first signal amplitude level detector means for detecting an amplitude level of the first mark reproducing signal;

second signal amplitude level detector means for detecting an amplitude level of the second mark reproducing signal;

difference value calculator means for calculating a difference value between the first and second amplitude levels;

comparator means for comparing the difference value with a predetermined threshold value; and optical output control means for adjusting the reproducing laser beam to an output level which makes the difference value lower than the predetermined threshold value.

14. An apparatus according to claim 13, wherein the optical output adjustment apparatus further comprises power adjustment pattern writing means for writing the power adjustment pattern into the reference area.

15. An apparatus according to claim 13, wherein the first mark is a shortest mark and the second mark is a longest mark.

16. An optical output adjustment method for adjusting an output level of a reproducing laser beam, in a signal reproducing device which adopts a magnetic wall movement detection reproducing method, irradiates the reproducing laser beam onto a magneto-optical information recording medium on which data is recorded in a data area by recording marks having different recording lengths according to a predetermined modulation method and a reproducing power adjustment pattern constructed only by first and second marks having different lengths is written in a reference area, and magnifies a magnetic sector by magnetic wall movement, thereby to perform reproducing of the data, wherein based on a comparison result between a predetermined threshold value and a difference value between first and second amplitude levels of first and second mark reproducing signals corresponding to components of the first and second marks obtained by reproducing the reproducing power adjustment pattern, the reproducing laser beam is adjusted to an output level which makes the difference value lower than the predetermined threshold value.

17. A method according to claim 16, wherein the power adjustment pattern is written into the reference area.

18. A method according to claim 16, wherein the first mark is a shortest mark and the second mark is a longest mark.

19. An optical output adjustment apparatus for adjusting an output level of a reproducing laser beam, in a signal reproducing device which adopts a magnetic wall movement detection reproducing method, irradiates the reproducing laser beam onto a magneto-optical information recording medium on which data is recorded on a data area by recording marks having different recording lengths according to a predetermined modulation method and a reproducing power adjustment pattern is written in a reference area, and magnifies a magnetic sector by magnetic wall movement, thereby to perform reproducing of the data, wherein the optical output adjustment apparatus comprises:

a light source for emitting the reproducing laser beam;

differentiator means for differentiating a power adjustment reproducing signal obtained by reproducing the reproducing power adjustment pattern, thereby to output a differential signal;

signal amplitude level detector means for detecting an amplitude level of the differential signal;

comparator means for comparing the amplitude level with a predetermined threshold value; and optical output control means for adjusting the reproducing laser beam to an output level which makes the amplitude level higher than the predetermined threshold value.

20. An apparatus according to claim 19, wherein the optical output adjustment apparatus further comprises power adjustment pattern writing means for writing the power adjustment repetitive pattern into the reference area.

21. An optical output adjustment method for adjusting an output level of a reproducing laser beam, in a signal reproducing device which adopts a magnetic wall movement detection reproducing method, irradiates the reproducing laser beam onto a magneto-optical information recording medium on which data is recorded on a data area by recording marks having different recording lengths according to a predetermined modulation method and a reproducing power adjustment pattern is written in a reference area, and magnifies a magnetic sector by magnetic wall movement, thereby to perform reproducing of the data, wherein based on a comparison result between a predetermined threshold value and an amplitude level of a differential signal obtained by differentiating a power adjustment reproducing signal obtained by reproducing the reproducing power adjustment pattern, the reproducing laser beam is adjusted to an output level which makes the amplitude level higher if than the predetermined threshold value.

22. A method according to claim 21, wherein the power adjustment pattern is written into the reference area.

23. An optical output adjustment apparatus for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data, wherein the optical output adjustment apparatus comprises:

a light source configured to emit the reproducing laser beam;

a reproducing signal detector configured to detect a shortest recording mark reproducing signal corresponding to a component of a shortest recording mark in a reproducing signal obtained by reproducing the magneto-optical information recording medium;

a signal amplitude level detector configured to detect an amplitude level of the shortest recording mark reproducing signal;

a comparator unit configured to compare the amplitude level with a predetermined threshold value; and an optical output control unit configured to adjust the reproducing laser beam to an output level which makes the amplitude level higher than the predetermined threshold value.

24. An optical output adjustment apparatus for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data, wherein the optical output adjustment apparatus comprises:

a light source configured to emit the reproducing laser beam;

a first reproducing signal detector configured to detect a first recording mark reproducing signal corresponding to a component of a first recording mark in a reproducing signal obtained by reproducing the magneto-optical information recording medium;

a second reproducing signal detector configured to detect a second recording mark reproducing signal corresponding to a component of a second recording mark in a reproducing signal obtained by reproducing the magneto-optical information recording medium;

a first signal amplitude level detector configured to detect a first amplitude level of the first recording mark reproducing signal;

a second signal amplitude level detector configured to detect a second amplitude level of the second recording mark reproducing signal;

a difference value calculator unit configured to calculate a difference value between the first and second amplitude levels;

a comparator unit configured to compare the difference value with a predetermined threshold value; and an optical output control unit configured to adjust the reproducing laser beam to an output level which makes the difference value lower than the predetermined threshold value.

25. An optical output adjustment apparatus for adjusting an output level of a reproducing laser beam, in a signal reproducing device which adopts a magnetic wall movement detection reproducing method, irradiates the reproducing laser beam onto a magneto-optical information recording medium on which data is recorded by recording marks having different recording lengths according to a predetermined modulation method, and magnifies a magnetic sector by magnetic wall movement, thereby to perform reproducing of the data, wherein the optical output adjustment apparatus comprises:

a light source configured to emit the reproducing laser beam;

a differentiator unit configured to differentiate a reproducing signal obtained by reproducing the magneto-optical information recording medium, thereby to output a differential signal;

a signal amplitude level detector configured to detect an amplitude level of the differential signal;

a comparator unit configured to compare the amplitude level with a predetermined threshold value; and an optical output control unit configured to adjust the reproducing laser beam to an output level which makes the amplitude level higher than the predetermined threshold value.

26. An optical output adjustment apparatus for adjusting an output level of a reproducing laser beam, in a signal reproducing device which adopts a magnetic wall movement detection reproducing method, irradiates the reproducing laser beam onto a magneto-optical information recording medium on which data is recorded on a data area by recording marks having different recording lengths according to a predetermined modulation method and a reproducing power adjustment repetitive pattern constructed only by shortest marks is written in a reference area, and magnifies a magnetic sector by magnetic wall movement, thereby to perform reproducing of the data, wherein the optical output adjustment apparatus comprises:

- a light source configured to emit the reproducing laser beam;
- a reproducing signal detector configured to detect a power adjustment reproducing signal obtained by reproducing the reproducing power adjustment repetitive pattern;
- a signal amplitude level detector configured to detect an amplitude level of the power adjustment reproducing signal;
- a comparator unit configured to compare the amplitude level with a predetermined threshold value; and
- an optical output control unit configured to adjust the reproducing laser beam to an output level which makes the amplitude level higher than the predetermined threshold value.

27. An optical output adjustment apparatus for adjusting an output level of a reproducing laser beam, in a signal reproducing device which adopts a magnetic wall movement detection reproducing method, irradiates the reproducing laser beam onto a magneto-optical information recording medium on which data is recorded in a data area by recording marks having different recording lengths according to a predetermined modulation method and a reproducing power adjustment pattern constructed only by first and second marks having different lengths is written in a reference area, and magnifies a magnetic sector by magnetic wall movement, thereby to perform reproducing of the data, wherein the optical output adjustment apparatus comprises:

- a light source configured to emit the reproducing laser beam;
- a first reproducing signal detector configured to detect a first mark reproducing signal corresponding to a component of the first mark in a power adjustment reproducing signal obtained by reproducing the reproducing power adjustment pattern;
- a second reproducing signal detector configured to detect a second mark reproducing signal corresponding to a component of the second mark in a power adjustment reproducing signal obtained by reproducing the reproducing power adjustment pattern;
- a first signal amplitude level detector configured to detect an amplitude level of the first mark reproducing signal;
- a second signal amplitude level detector configured to detect an amplitude level of the second mark reproducing signal;
- a difference value calculator unit configured to calculate a difference value between the first and second amplitude levels;
- a comparator unit configured to compare the difference value with a predetermined threshold value; and
- an optical output control unit configured to adjust the reproducing laser beam to an output level which makes the difference value lower than the predetermined threshold value.

28. An optical output adjustment apparatus for adjusting an output level of a reproducing laser beam, in a signal reproducing device which adopts a magnetic wall movement detection reproducing method, irradiates the reproducing laser beam onto a magneto-optical information recording medium on which data is recorded on a data area by recording marks having different recording lengths according to a predetermined modulation method and a reproducing power adjustment pattern is written in a reference area, and magnifies a magnetic sector by magnetic wall movement, thereby to perform reproducing of the data, wherein the optical output adjustment apparatus comprises:

- a light source configured to emit the reproducing laser beam;
- a differentiator unit configured to differentiate a power adjustment reproducing signal obtained by reproducing the reproducing power adjustment pattern, thereby to output a differential signal;
- a signal amplitude level detector configured to detect an amplitude level of the differential signal;
- a comparator unit configured to compare the amplitude level with a predetermined threshold value; and
- an optical output control unit configured to adjust the reproducing laser beam to an output level which makes the amplitude level higher than the predetermined threshold value.

* * * * *

UNITED STATES PATENT AND TRADEMARK OFFICE
CERTIFICATE OF CORRECTION

PATENT NO. : 6,552,967 B1
DATED : April 22, 2003
INVENTOR(S) : Keiichi Tsutsui

It is certified that error appears in the above-identified patent and that said Letters Patent is hereby corrected as shown below:

<u>Column 1,</u>
Line 64, delete "a reproducing."

<u>Column 10,</u>
Line 49, change "in creases" to -- increases --.

<u>Column 14,</u>
Lines 33 and 55, change "case" to -- cases --.

<u>Column 15,</u>
Lines 14 and 39, change "case" to -- cases --.

<u>Column 16,</u>
Line 6, change "eight" to -- eighth --.
Line 23, change "which drives which drives" to -- which drives --.
Lines 28 and 29, change "to which" to -- as in --.
Line 35, before "convergence" delete "a".
Line 56, change "tacking" to -- tracking --.
Lines 58 and 60, before "enter" insert -- to --.

<u>Column 20,</u>
Line 44, change "are" to -- area --.
Line 51, change "are" to -- and --.
Line 54, change "C$\Delta$V" to -- CAV --.

<u>Column 21,</u>
Line 34, change "fist" to -- first --.
Line 47, change "m-ark" to -- mark --.

UNITED STATES PATENT AND TRADEMARK OFFICE
CERTIFICATE OF CORRECTION

PATENT NO. : 6,552,967 B1
DATED : April 22, 2003
INVENTOR(S) : Keiichi Tsutsui

It is certified that error appears in the above-identified patent and that said Letters Patent is hereby corrected as shown below:

Column 23,
Line 5, change "witch" to -- switch --.

Signed and Sealed this

Thirteenth Day of January, 2004

JON W. DUDAS
*Acting Director of the United States Patent and Trademark Office*